United States Patent
Song et al.

(10) Patent No.: US 12,499,943 B2
(45) Date of Patent: Dec. 16, 2025

(54) SPIKING NEURAL NETWORK DEVICE, NONVOLATILE MEMORY DEVICE, AND OPERATION METHOD THEREOF

(71) Applicant: Samsung Electronics Co., Ltd., Suwon-si (KR)

(72) Inventors: Seunghwan Song, Suwon-si (KR); Byung-Gook Park, Seoul (KR); Bosung Jeon, Seoul (KR)

(73) Assignees: SAMSUNG ELECTRONICS CO., LTD., Suwon-si (KR); Seoul National University R&DB Foundation, Seoul (KR)

( * ) Notice: Subject to any disclaimer, the term of this patent is extended or adjusted under 35 U.S.C. 154(b) by 413 days.

(21) Appl. No.: 17/959,356

(22) Filed: Oct. 4, 2022

(65) Prior Publication Data

US 2023/0215498 A1 Jul. 6, 2023

(30) Foreign Application Priority Data

Jan. 6, 2022 (KR) .................. 10-2022-0002331
May 6, 2022 (KR) .................. 10-2022-0056055

(51) Int. Cl.
*G11C 16/04* (2006.01)
*G11C 16/08* (2006.01)
*G11C 16/24* (2006.01)

(52) U.S. Cl.
CPC .......... *G11C 16/0433* (2013.01); *G11C 16/08* (2013.01); *G11C 16/24* (2013.01)

(58) Field of Classification Search
CPC ..... G11C 16/0433; G11C 16/08; G11C 16/24; G11C 11/54; G11C 16/26; G11C 7/1006; G06N 3/08; G06N 3/049; G06N 3/063
See application file for complete search history.

(56) References Cited

U.S. PATENT DOCUMENTS 6,292,392 B1 * 9/2001 Fukui ................. G11C 16/3445
                                                                365/185.11
8,913,446 B2 * 12/2014 Harada .............. G11C 16/3459
                                                                365/189.16

(Continued)

FOREIGN PATENT DOCUMENTS

KR    1020210022982 A    3/2021

OTHER PUBLICATIONS

European Patent Office Search Report with a mailing date of Jun. 23, 2023 from the European Patent Office for EP Patent Application 22217004.5, which corresponds to the U.S. application.

*Primary Examiner* — Joshua L Schwartz
*Assistant Examiner* — James S Wells
(74) *Attorney, Agent, or Firm* — Muir Patent Law, PLLC

(57) ABSTRACT

A spiking neural network device comprises at least one NAND cell string including a first NAND cell string that includes a string select transistor and a plurality of nonvolatile memory cells between a bit line and a ground select line, a string control circuit configured to generate a string selection signal to turn on the string select transistor in response to an input spike, a word line decoder configured to generate a word line selection signal for selecting a word line of a plurality of word lines for each of the plurality of nonvolatile memory cells in response to the input spike, a plurality of sensing circuits connected to the bit line, respectively corresponding to the plurality of word lines, each sensing circuit configured to generate an output spike according to a current transmitted through the bit line when a corresponding word line is selected, a plurality of switch transistors, each configured to connect one of the plurality of sensing circuits to the bit line according to a switch selection signal, and a switch decoder configured to generate a switch (Continued)

selection signal in synchronization with the word line selection signal for a selected word line.

13 Claims, 19 Drawing Sheets

(56) References Cited

U.S. PATENT DOCUMENTS

| | | | |
|---|---|---|---|
| 9,563,841 | B2 | 2/2017 | Rivera et al. |
| 10,886,364 | B2 * | 1/2021 | Yang ................. H01L 21/31111 |
| 11,055,603 | B2 | 7/2021 | Park et al. |
| 11,062,197 | B2 | 7/2021 | Lin et al. |
| 11,087,207 | B2 | 8/2021 | Tran et al. |
| 2012/0259804 | A1 * | 10/2012 | Brezzo ................... G06N 3/063 |
| | | | 706/33 |
| 2014/0156578 | A1 * | 6/2014 | Thibeault ............... G06N 3/063 |
| | | | 706/26 |
| 2019/0019538 | A1 * | 1/2019 | Li .......................... G06N 3/049 |
| 2021/0166108 | A1 | 6/2021 | Lee et al. |
| 2021/0225439 | A1 | 7/2021 | Yasuda et al. |
| 2021/0391027 | A1 * | 12/2021 | Hsu ..................... G11C 11/5642 |
| 2022/0398439 | A1 * | 12/2022 | Zhang .................. G11C 16/10 |

* cited by examiner

SPIKING NEURAL NETWORK DEVICE, NONVOLATILE MEMORY DEVICE, AND OPERATION METHOD THEREOF

CROSS-REFERENCE TO RELATED APPLICATIONS

This application claims priority under 35 U.S.C. § 119 to Korean Patent Application No. 10-2022-0002331 filed on Jan. 6, 2022, and Korean Patent Application No. 10-2022-0056055 filed on May 6, 2022, both filed in the Korean Intellectual Property Office, the disclosures of which are incorporated by reference herein in their entireties.

BACKGROUND

Embodiments of the present disclosure described herein relate to a semiconductor device, and more particularly, to a spiking neural network device, a nonvolatile memory device, and an operating method thereof.

The computing paradigm is shifting from CPU-centric systems to data-centric systems. A new computing architecture is required to overcome the performance limitations of the current von-Neumann architecture. In particular, neuromorphic computing that mimics the biological brain is attracting attention as one of the alternative approaches to the von-Neumann architecture. Neuromorphic computing is being actively studied because it has high potential in terms of power consumption, scalability, and computational speed.

A spiking neural network (hereinafter, SNN) is a neural network that most directly describes neurons in nature. A spiking neural network SNN consists of a synapse array that stores weight and a neuron that is responsible for activation. In addition, the spiking neural network SNN is used by transforming the input data size using coding using the concept of time. Accordingly, input signals having the same magnitude may be multiple-simultaneously input to the spiking neural network SNN according to a coding scheme. A synapse array, one of the components of a spiking neural network SNN, receives multiple-simultaneous inputs in the form of voltages and converts them into currents corresponding to weights stored in each storage device (synaptic memory cell). And the currents of the individual synaptic memory cells converted according to the weight are summed up again in the array. An output is generated according to the magnitude of the summed current of the individual synaptic memory cells.

Recently, with the development of hardware-based machine learning or in-memory computing technology, the complexity of a spiking neural network SNN is also increasing. More synaptic cells are needed for the implementation of a spiking neural network SNN, and higher efficiency is required. NAND flash arrays, which provide high data capacity and density, have individual synaptic cells connected in series. Therefore, there is a problem in that it is difficult to combine the currents of individual synaptic memories in which a weight is applied to input spikes inputted multiple-simultaneously in one string.

SUMMARY

Embodiments of the present disclosure provide a spiking neural network SNN device using a NAND flash memory having a high degree of integration as a synaptic memory, a nonvolatile memory device, and an operating method thereof.

According to an embodiment of the inventive concept, a spiking neural network device comprises at least one NAND cell string including a first NAND cell string that includes a string select transistor and a plurality of nonvolatile memory cells between a bit line and a ground select line, a string control circuit configured to generate a string selection signal to turn on the string select transistor in response to an input spike, a word line decoder configured to generate a word line selection signal for selecting a word line of a plurality of word lines for each of the plurality of nonvolatile memory cells in response to the input spike, a plurality of sensing circuits connected to the bit line, respectively corresponding to the plurality of word lines, each sensing circuit configured to generate an output spike according to a current transmitted through the bit line when a corresponding word line is selected, a plurality of switch transistors, each configured to connect one of the plurality of sensing circuits to the bit line according to a switch selection signal, and a switch decoder configured to generate a switch selection signal in synchronization with the word line selection signal for a selected word line.

According to an embodiment of the inventive concept, a nonvolatile memory device comprises a bit line, a NAND cell string including a plurality of memory cells and connected to the bit line in response to an input spike, a plurality of sensing circuits configured to generate an output spike by sensing read currents of memory cells of the NAND cell string in units of word lines, and switch transistors configured to connect the bit line to any one of the plurality of sensing circuits in synchronization with a word line selection of the NAND cell string, wherein weights for a spiking neural network SNN operation are programmed in the memory cells of the NAND cell string.

According to an embodiment of the inventive concept, a method of operating a spiking neural network device storing synaptic weights in a plurality of NAND cell strings comprises detecting a first input spike, turning on a first string select transistor of a first NAND cell string for a string select time period in response to the first input spike, sensing a cell current of the first NAND cell string through a first sensing circuit by selecting a first word line, detecting a second input spike, turning on a second string select transistor of a second NAND cell string during the string select time period when the second input spike is detected, and sensing a combined cell current of the first NAND cell string and the second NAND cell string through a second sensing circuit by selecting a second word line.

BRIEF DESCRIPTION OF THE FIGURES

The above and other objects and features of the present disclosure will become apparent by describing in detail embodiments thereof with reference to the accompanying drawings.

DETAILED DESCRIPTION

It is to be understood that both the foregoing general description and the following detailed description are exemplary, and it is to be considered that an additional description of the claimed invention is provided. Reference signs are indicated in detail in various embodiments of the present invention, examples of which are indicated in the reference drawings. Wherever possible, the same reference numbers are used in the description and drawings to refer to the same or like parts.

Hereinafter, a NAND flash memory will be used as an example of a semiconductor memory device for describing the features and functions of the present invention. However, one skilled in the art will readily appreciate other advantages and capabilities of the present invention in accordance with the teachings herein. The present invention may be implemented or applied through other embodiments. Moreover, the detailed description may be modified or changed according to the viewpoint and application without departing significantly from the scope, spirit and other objects of the present invention.

Figure 1:
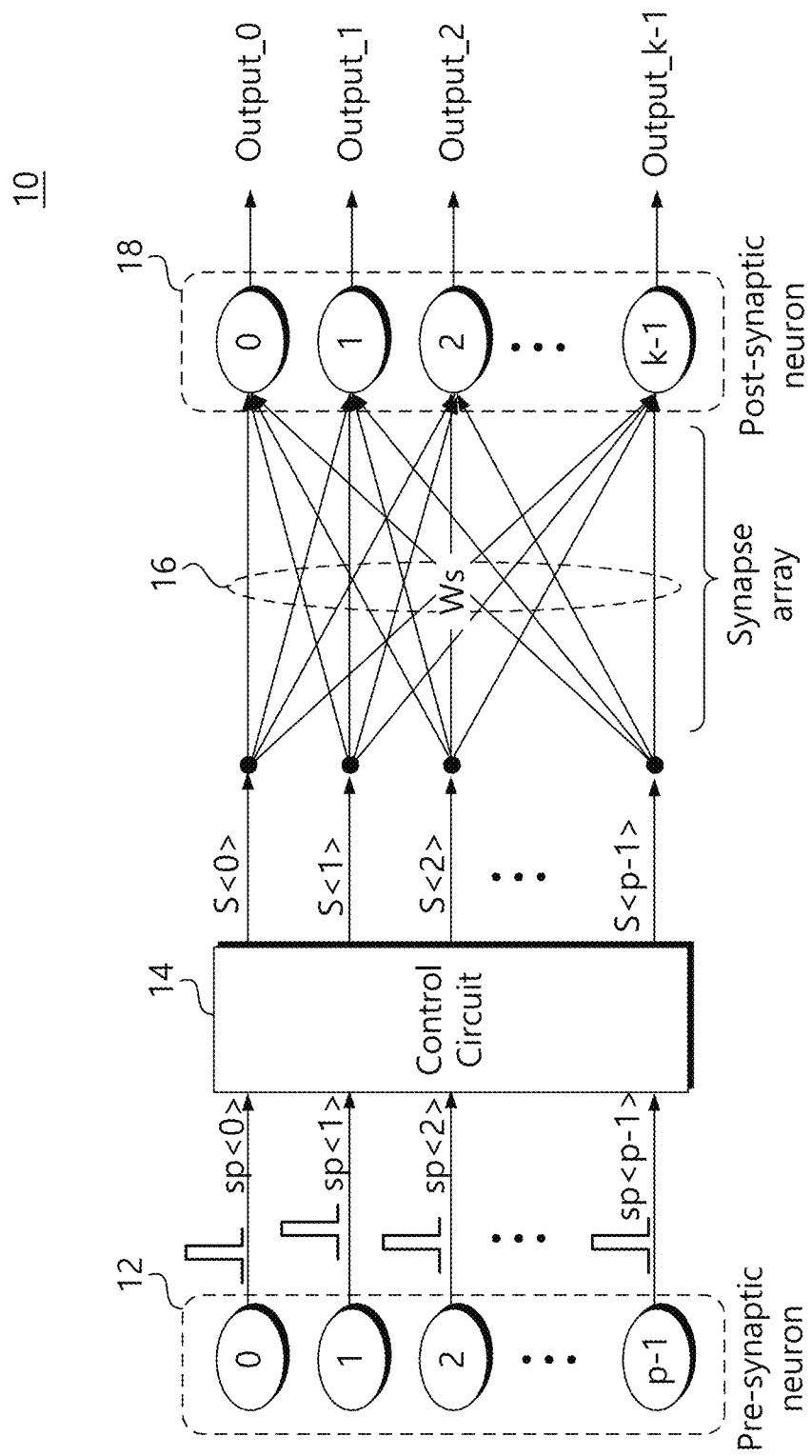
FIG. 1 is a diagram briefly showing a spiking neural network SNN according to an embodiment of the present invention.

FIG. 1 is a diagram briefly showing a spiking neural network SNN according to an embodiment of the present invention. Referring to FIG. 1, the spiking neural network 10 may be modeled as a pre-synaptic neuron 12, a control circuit 14, a synapse array 16, and a post-synaptic neuron 18.

The pre-synaptic neuron 12 generates input spikes (sp<j>, where j is an integer greater than or equal to 0 and corresponds to a particular spike). The pre-synaptic neuron 12 may be a post-synaptic neuron of a previous layer in a multi-layer spiking neural network SNN.

The control circuit 14 converts the simultaneous and multiple input spikes sp<j> into a string selection signal S<j>, where j is an integer greater than or equal to 0. For example, the control circuit 12 converts input spikes sp<j> that occur simultaneously through several input channels into a string selection signal S<j> having an address corresponding to a corresponding channel. The control circuit 12 may generate a string selection signal S<j> in which a pulse width is converted in response to any one input spike sp<j>. For example, according to some embodiments, the control circuit 12 generates a string selection signal S<j> having a pulse width longer than a pulse width of the corresponding input spike sp<j> and capable of reading all memory cells of one NAND cell string. Accordingly, the pulse width of the string selection signal S<j> corresponds to the time taken to read one memory cell multiplied by the number of memory cells (k) included in the string. For example, assume that the control circuit 12 generates a string selection signal S<0> that is activated for a string select time ΔT in response to a first input spike. Here, the string selection time ΔT may be a time required to sequentially read all of the memory cells included in one string.

The post-synaptic neuron 18 includes 'k' neurons for accumulating synaptic weights Ws transmitted through the synapse array 16. The post-synaptic neuron 18 integrates the current reflecting the synaptic weight (Ws) provided by the synapse array 16 according to 'p' string selection signals S<j>. And then the output spike is fired according to the integrated current value. When 'k' neurons are included in the post-synaptic neuron 18, 'k' output spikes Output_0 to Output_k−1 may be fired. When the spiking neural network 10 is configured as a multi-layer, the post-synaptic neuron 18 may be regarded as a pre-synaptic neuron of a subsequent layer.

The spiking neural network 10 of the present invention may use a memory element array of a NAND flash memory as a synaptic element array. For example, the string selection signal S<j> generated from the control circuit 14 may be implemented with a signal for selecting a string of the NAND flash memory, and the synaptic weights Ws may be implemented with data stored in each of the memory cells. In addition, the post-synaptic neuron 18 may be implemented with a plurality of sensing circuits that accumulate currents transferred from a plurality of strings according to weights and generate output spikes according to the integrated currents.

A vertically stacked three-dimensional NAND flash memory (hereinafter referred to as a V-NAND flash memory) may be used to implement the above-described spiking neural network 10. In the case of using the V-NAND flash memory, the spiking neural network 10 that facilitates the expansion of the synaptic weight Ws by the large memory capacity may be implemented.

Figure 2:
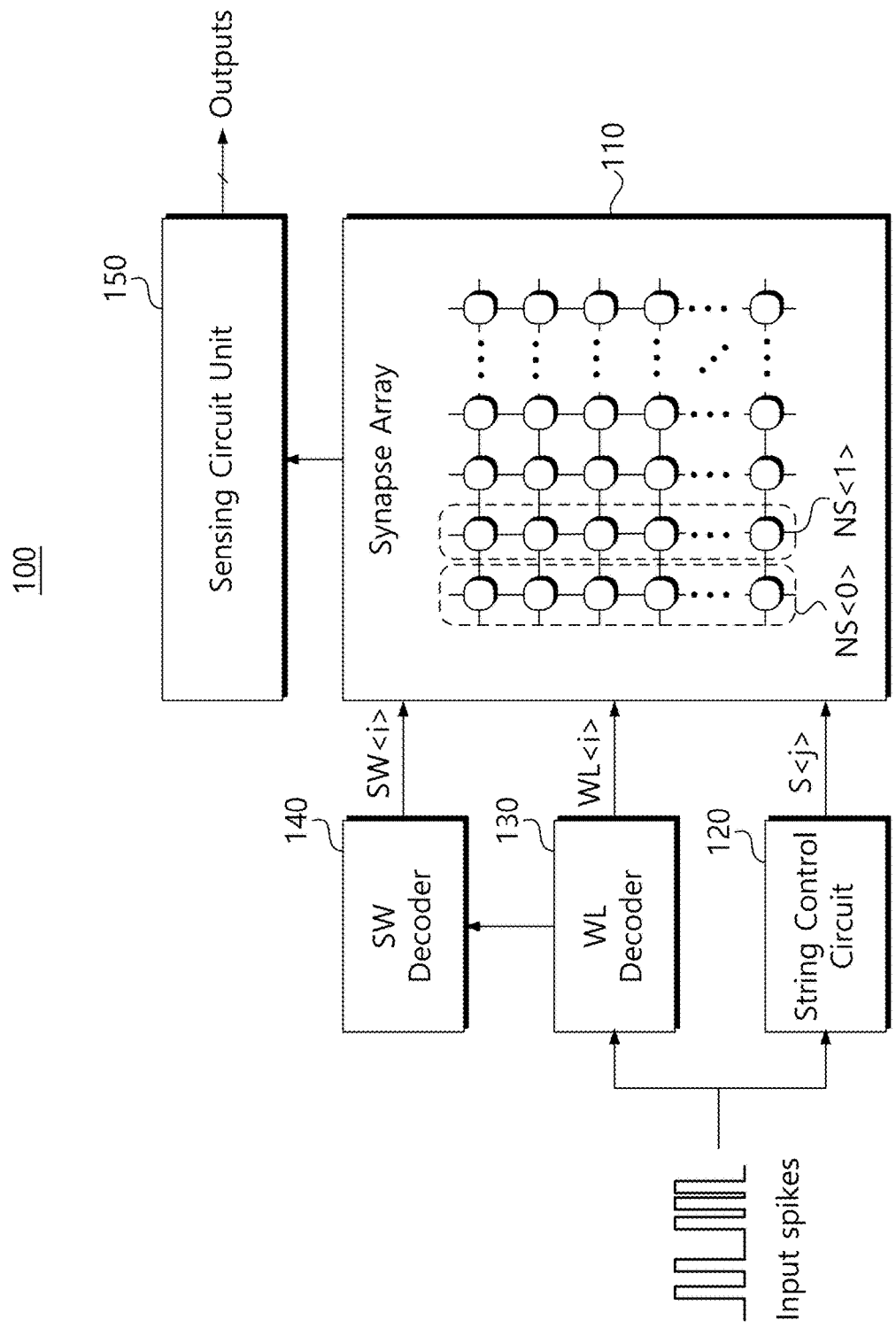
FIG. 2 is a block diagram showing a neuromorphic device for implementing a spiking neural network according to an embodiment of the present invention.

FIG. 2 is a block diagram showing a neuromorphic device for implementing a spiking neural network SNN according to an embodiment of the present invention. Referring to FIG. 2, the neuromorphic device 100 according to aspects of the present invention includes a synapse array 110, a string control circuit 120, a word line decoder 130, a switch decoder 140, and a sensing circuit unit 150. The neuromorphic device 100 described in FIG. 2 corresponds to an example configuration for implementing the control circuit 14, the synapse array 16, and the post-synaptic neuron 18 of FIG. 1.

The synapse array 110 includes a plurality of memory cells arranged in rows and columns. The memory cells may be formed of NAND flash memory cells. In this case, the synapse array 110 may include a plurality of NAND cell strings NS<j> connected between the bit line BL and the ground selection line GSL. Each of the plurality of NAND cell strings NS<j> may include a plurality of flash memory cells and selection transistors connected in series. In addition, the synapse array 110 may have a V-NAND structure in which memory cells are formed in a three-dimensional array by a plurality of word line layers and pillars stacked vertically with respect to a substrate. However, it will be well understood that the structure of the synapse array 110 is not limited to the V-NAND structure.

The string control circuit 120 detects an input spike and generates a string selection signal S<j> according to the detection result. The string control circuit 120 generates a string selection signal S<j> corresponding to a channel address (e.g., a string) of the corresponding spike in response to each of the input spikes. For example, the string control circuit 120 activates a selection signal S<2> to select a corresponding string when an input spike sp<2> occurs in the '2' neuron among the plurality of neurons of the pre-synaptic neuron 14. When a first input spike sp<0> is detected among the plurality of input spikes sp<0> to sp<p−1>, the string control circuit 120 may generate a string selection signal S<0> that is activated during a time when all of the memory cells included in the cell string can be read, that is, the string selection time ΔT, also described as a string selection time period. The first cell string NS<0> is electrically connected to the bit line BL by the string selection signal S<0>. In addition, the string control circuit 120 detects a second input spike (sp<1>) input from among the plurality of input spikes (sp<0> to sp<p−1>), the string control circuit 120 generates a string selection signal S<1> that is activated during the string selection time ΔT (e.g., for a string selection time period). Then, the second cell string NS<1> is electrically connected to the line BL by the string selection signal S<1>. Throughout this specification, components described as electrically connected to each other based on a selection signal or using a transistor are considered electrically disconnected when configured such that a current does not pass between the components, and as electrically connected when configured such that a current passes between the components. Similarly, components described as connected to each other in response to a signal or spike should be considered to be electrically disconnected when configured such that a current does not pass between the components, and to be electrically connected when configured such that a current passes between the components.

The word line decoder 130 generates a word line selection signal WL<i> for reading memory cells in response to the input spike. The word line decoder 130 generates a word line voltage for sequentially reading memory cells during the string selection time ΔT. For example, when 64 memory cells are to be sensed during the string selection time ΔT, the word line decoder 130 sequentially selects the word lines. In this case, a read voltage Vrd may be provided to the selected word line, and a read pass voltage Vread may be provided to the remaining unselected word lines. Selection of word lines by the word line decoder 130 may be performed in a sequential or random order. However, the word line decoder 130 will select all word lines during the string selection time ΔT. As will be described later, the number of selected word lines may be the same as the number of sensing circuits included in the sensing circuit unit 150.

The switch decoder 140 generates a switch selection signal SW<i> in conjunction with the word line decoder 130. For example, when the word line decoder 130 generates the word line selection signal WL<1>, the switch decoder 140 will generate the switch selection signal SW<1>. The switch decoder 140 selects a corresponding sensing circuit to sense a weighting current corresponding to the selected word line.

The sensing circuit unit 150 includes a plurality of sensing circuits sequentially selected by the switch decoder 140. Each of the sensing circuits corresponds to a respective node of the nodes of the post-synaptic neuron 18 (see FIG. 1). Each of the sense circuits sums the string currents provided by the selection of the corresponding word line. Each of the sensing circuits generates output spikes by comparing the summed current with a threshold value. As described further below, a plurality of sensing circuits are each configured to generate an output spike by sensing read currents of memory cells of a NAND cell string in units of word lines. A circuit configuration or function of each of the sensing circuits constituting the sensing circuit unit 150 will be described in detail with reference to the drawings to be described later.

According to the neuromorphic device 100 described above, one or more input spikes is applied to the string selection lines of each of the plurality of NAND cell strings. In addition, the string select transistor SST of each NAND cell string is activated during the string select time ΔT. Then, the word lines of each NAND cell string are sequentially selected during the string selection time ΔT, and at this time, the cell current sensed for each word line acts as a synapse weight and may be summed up by the respective sensing circuits.

Figure 3:
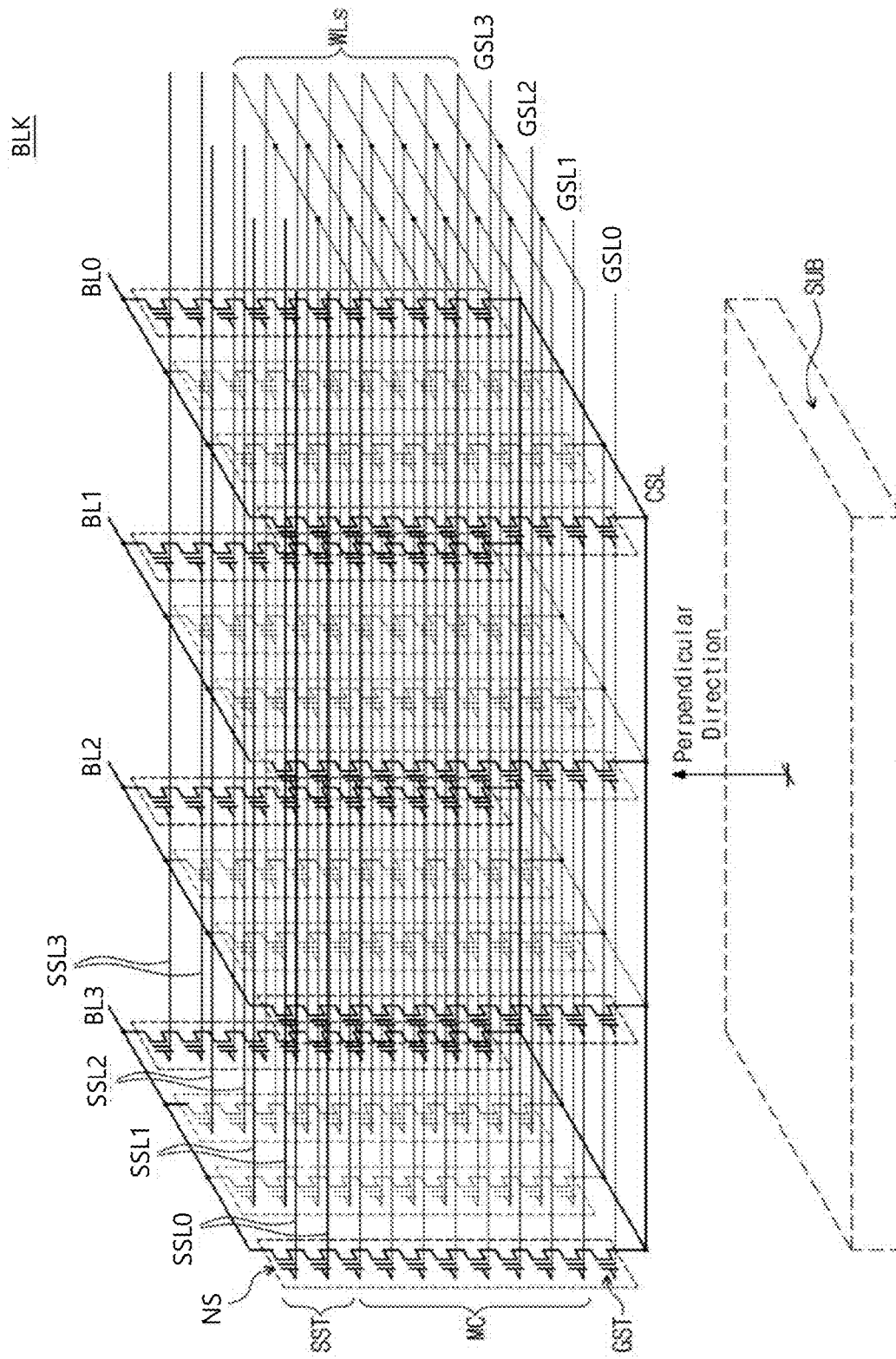
FIG. 3 is a circuit diagram showing an exemplary structure of a memory block constituting the synapse array of FIG. 2.

FIG. 3 is a circuit diagram showing an exemplary structure of a memory block constituting the synapse array of FIG. 2. Referring to FIG. 3, cell strings NS are formed between the bit lines BL0, BL1, BL2, and BL3 and the common source line CSL to form the memory block BLK.

Cell strings NS10, NS20, . . . are formed between the bit line BL0 and the common source line CSL. A plurality of cell strings NS11, NS21, NS12, NS22, NS13, and NS23 are also formed between the bit lines BL1, BL2, and BL3 and the common source line CSL in the same manner. The string select transistor SST of the cell strings NS is connected to a corresponding bit line BL. The ground selection transistor GST of the cell strings NS is connected to the common source line CSL. Memory cells MCs are provided between the string select transistor SST and the ground select transistor GST of the cell string NS.

Each of the cell strings NS includes a ground select transistor GST. Ground select transistors included in the cell strings NS may be controlled by the ground selection line GSL. Alternatively, although not shown, cell strings corresponding to each row may be controlled by different ground selection lines.

The above-described memory block BLK may be used as a synapse array of a spiking neural network SNN. That is, data reflecting the synaptic weight may be programmed into the memory cells MCs. The 'p' input nodes of the pre-synaptic neuron 12 may correspond to the gate of the string select transistor SST, and the synapse array 16 is implemented with data values stored in memory cells included in a plurality of cell strings. For example, each of the 'k' number of synaptic weights corresponds to a string current flowing by any one memory cell selected from among the 'k' number of word lines. In addition, 'k' sensing circuits may constitute an output node by 'k' switches (not shown) connected to the bit line BL.

A circuit structure of memory cells included in one memory block BLK has been briefly described above. However, the circuit structure of the illustrated memory block is only a simplified structure for convenience of description, and the actual memory block is not limited to the illustrated example. That is, it will be well understood that more semiconductor layers, bit lines BLs, and string select lines SSLs may be included in one physical block.

Figure 4:
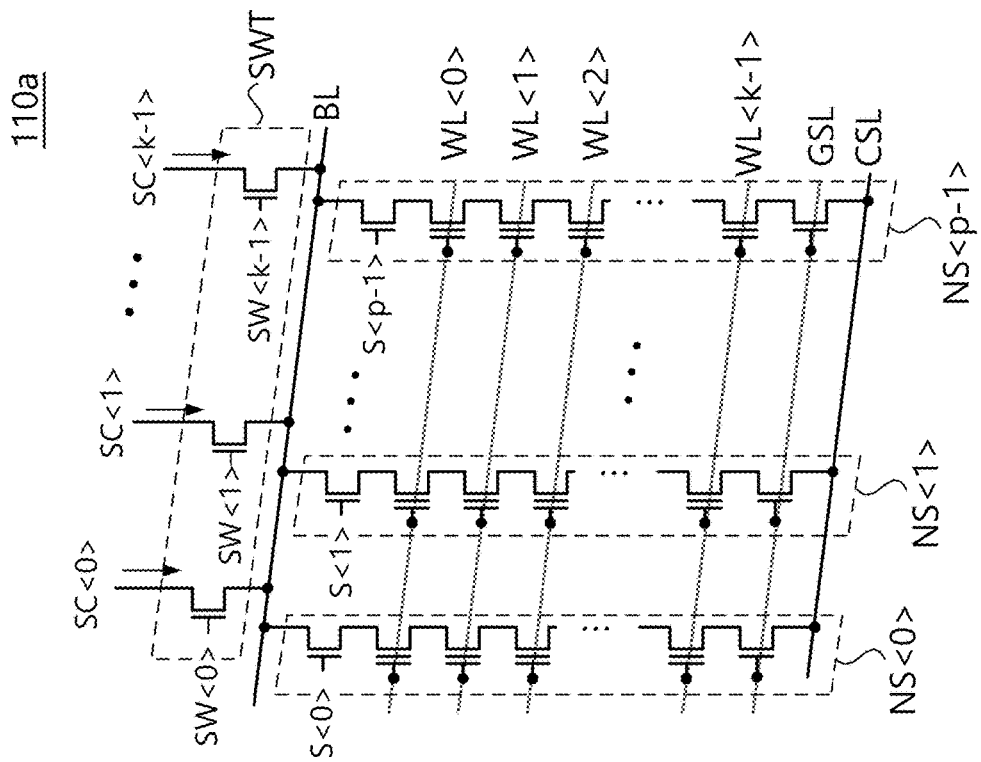
FIG. 4 is a circuit diagram showing an example of the synapse array of the present invention.

FIG. 4 is a circuit diagram showing an example of the synapse array according to aspects of the present invention. Referring to FIG. 4, the synapse array 110a includes a plurality of NAND cell strings NS<0>~NS<p−1> connected to the bit line BL, and a plurality of switch transistors SWT connecting sensing circuits SC<0>~SC<k−1> and the bit line BL.

In response to the input spike, the string selection circuit 120 (refer to FIG. 2) may activate the string selection signal S<0>. The string select transistor SST is turned on for the string select time ΔT by the string selection signal S<0>. Then, the cell string NS<0> is electrically connected to the bit line BL. Subsequently, the word line decoder 130 (refer to FIG. 2) sequentially applies a read voltage to the word lines WL<0> to WL<k−1> during the string selection time ΔT. In synchronization with the selection of the word lines WL<0> to WL<k−1>, the switch decoder 140 (refer to FIG. 2) also sequentially activates the switch selection signals SW<0> to SW<k−1>. Then, currents corresponding to the synaptic weights stored in the cell string NS<0> are sequentially transmitted to the sensing circuits SC<0> to SC<k−1>.

If the string selection signal S<1> is activated by another input spike, the cell string NS<1> is connected to the bit line BL for the string selection time ΔT. During the string selection time ΔT from the time when the string selection signal S<1> is activated, cell currents corresponding to all synaptic weights of the cell string NS<1> are transmitted to the sensing circuits SC<0> to SC<k−1>).

Via the above-described structure, in response to multiple simultaneous input spikes, the synaptic weight Ws stored in each of the series-connected memory cells may be converted into a cell current and provided to each of the sensing circuits SC<0> to SC<k−1>.

Here, the synaptic weight Ws may be programmed in memory cells of each of the plurality of NAND cell strings NS<0> to NS<p−1> as a pre-learned parameter. In addition, in the learning process of the spiking neural network SNN, the synaptic weight (Ws) may be updated with a data value that reflects the learning result. In order to update or program the synaptic weight Ws, a page buffer circuit may be provided separately from the sensing circuits SC<0> to SC<k−1>.

Figure 5A:
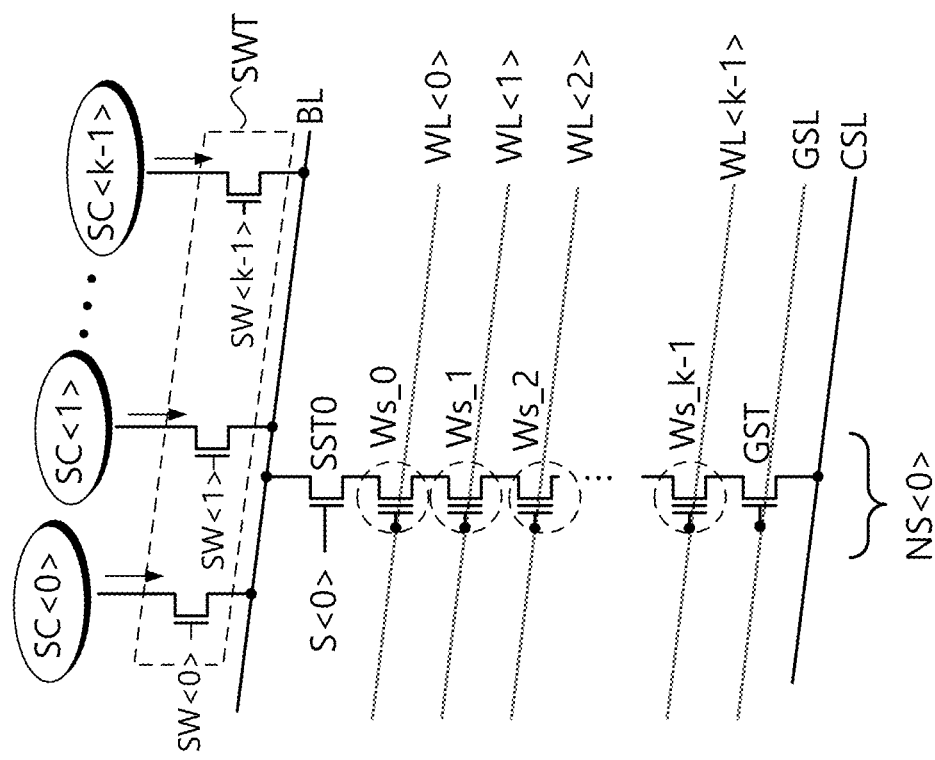
FIGS. 5A and 5B are diagrams illustrating a method of applying a synaptic weight according to the present invention.
Figure 5B:
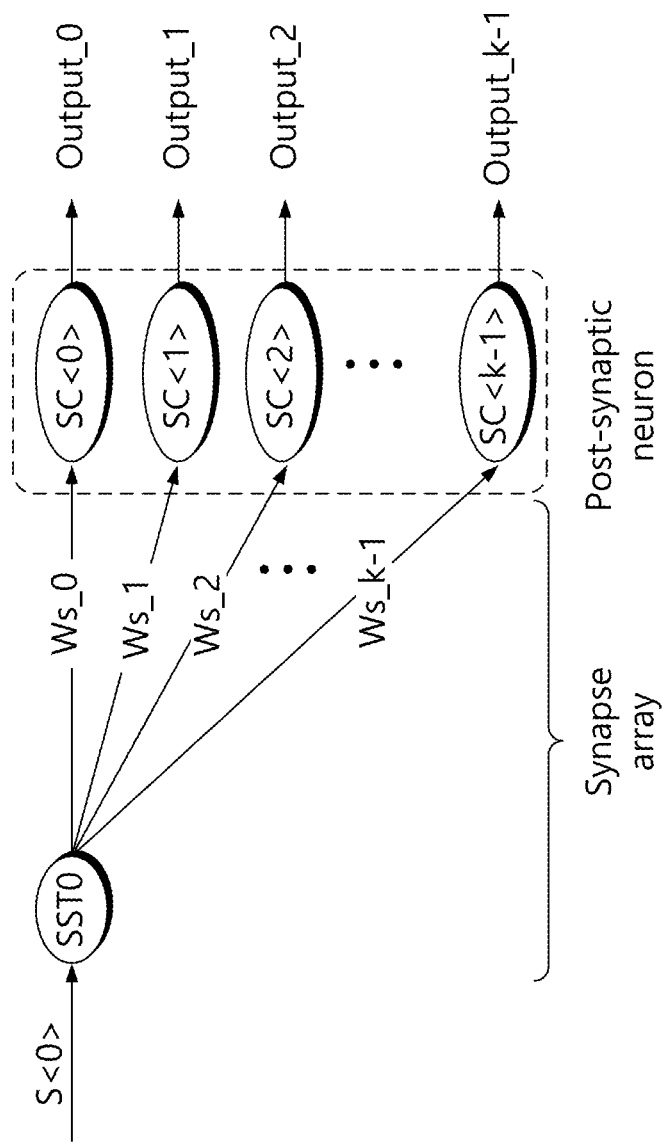

FIGS. 5A and 5B are diagrams showing a method of applying a synaptic weight of the present invention. Referring to FIG. 5A, the arrangement of the synaptic weight Ws_i and the sensing circuits SC<i> stored in one cell string NS<0> is briefly illustrated.

In the cell string NS<0>, the string selects transistor SST0 and memory cells are connected in series. The string select transistor SST0 connects the bit line BL and the cell string NS<0> in response to the string selection signal S<0>. When the string selection signal S<0> is activated, the string select transistor SST0 is turned on for the string selection time ΔT. Then, during the string selection time ΔT, the word lines WL<0> to WL<k−1> and the switch transistors SWT are synchronized and sequentially turned on. For example, when the word line (WL<0>) is selected and the synaptic weight (Ws_0) stored in the cell is read, the switch selection signal (SW<0>) is activated and the synaptic weight (Ws_0) is transmitted to the sensing circuit (SC<0>). Also, when the word line (WL<1>) is selected and the synaptic weight (Ws_1) stored in the cell is read, the switch selection signal (SW<1>) is activated and the synaptic weight (Ws_1) is transmitted to the sensing circuit (SC<1>).

The string select transistor SST0 that receives the string selection signal S<0> through the gate may constitute one input node of the spiking neural network SNN or a pre-synapse neuron. In addition, the memory cells of the cell string perform a synapse array function that transmits a synaptic weight Ws_i to output nodes (or sensing circuits).

Referring to FIG. 5B, an example of modeling the circuit of FIG. 5A as a spiking neural network SNNs is shown. The string select signal S<0> is provided to the string select transistor SST0 by the input spike. Then, the synaptic weights Ws_i stored in the memory cells serially connected to the cell string NS<0> are transmitted to the sensing circuits SC<i> constituting the post-synaptic neuron. For brevity, the string selection signal S<0> corresponding to one input spike and output nodes corresponding to the sensing circuits SC<i> are illustrated in FIG. 5B. However, input spikes can occur multiply or simultaneously. Accordingly, cell strings NS<j> in which other synaptic weights are stored may be selected multiply or simultaneously and cell currents corresponding to the synaptic weight may be transmitted to the sensing circuits SC<i>.

Figure 6:
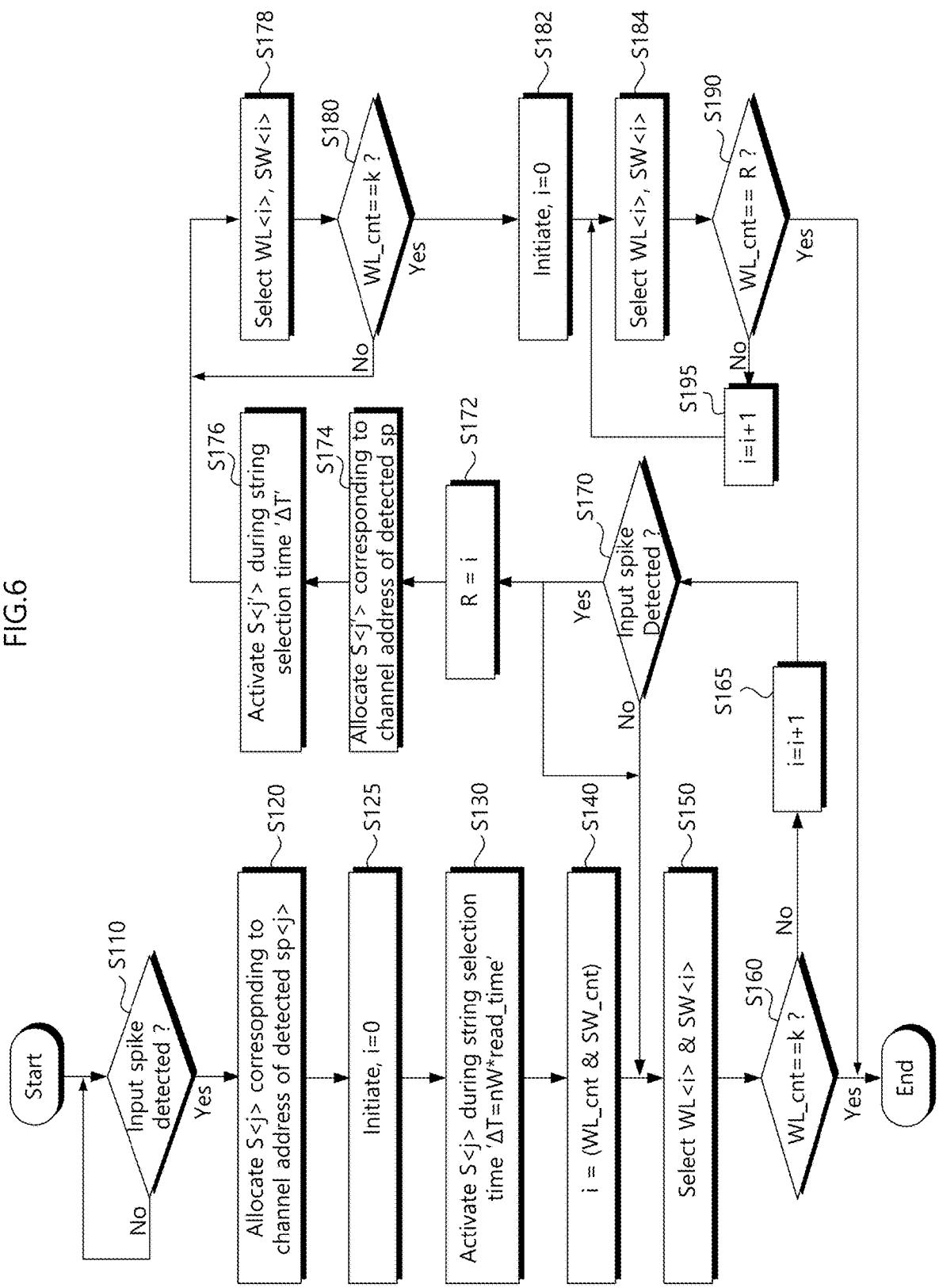
FIG. 6 is a flowchart illustrating operations of a string control circuit, a word line decoder, and a switch decoder according to an embodiment of the present invention.

FIG. 6 is a flowchart illustrating operations of a string control circuit, a word line decoder, and a switch decoder according to an embodiment of the present invention. As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts Referring to FIG. 6, the string control circuit 120 (refer to FIG. 2) generates a string selection signal S<j> in response to a channel address of an input spike that occurs multiply or simultaneously. In addition, the word line decoder 130 (refer to FIG. 2) and the switch decoder 140 (refer to FIG. 2) sequentially or randomly select or activate the word line WLs and the switch transistors SWT in response to an input spike.

In step S110, the string control circuit 120 and the word line decoder 130 detect an input spike. Operational branching occurs according to the detection result of the input spike. When the input spike is detected (direction 'Yes'), the procedure moves to step S120. On the other hand, if the input spike is not detected ('No' direction), the procedure returns to step S110 for the detection of the input spike.

In step S120, a string selection signal S<j> corresponding to a channel address of the detected input spike sp<j> is allocated. That is, the cell string NS<j> corresponding to the channel address of the detected input spike sp<j> may be selected. The input spike can be provided according to the channel address of the pre-synaptic neuron (12, see FIG. 1) output. When one input spike is detected, one cell string NS<j> of a channel address corresponding to the detected input spike is selected. During the string selection time ΔT in which the selected cell string NS<j> is electrically connected to the bit line BL, the word line WLs and the switch transistors SWT are be selected one by one.

In step S125, the selection variable 'i' is initialized. For example, the selection variable 'i' may be initialized to '0'. Here, 'i' is a word line selection variable designating a plurality of word lines WL and a switch transistor SWT associated with the word lines WL. The selection variable 'i' is an integer greater than or equal to 0.

In step S130, the string control circuit 120 activates the string selection signal S<j>. If the channel address corresponding to the input spike sp<0> corresponds to the cell string NS<0>, the string selection signal S<0> will be activated in response to the initial input spike. The string control circuit 120 activates the string selection signal S<j> during the string selection time ΔT in which all memory cells included in the cell string NS<0> can be read. For example, if 'nW' memory cells are included in the cell string NS<0>, the string selection signal S<0> is activated for a time obtained by multiplying the read time per memory cell 'read time' by 'nW'. Here, 'nW' is a fixed constant value. The input spike sp<0> may be described as a first input spike, the cell string NS<0> may be described as the first cell string, and the string selection signal S<0> may be described as the first string selection signal. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

In step S140, the word line decoder 130 and the switch decoder 140 set the word line count WL_cnt and the switch count SW_cnt to the set selection variable 'i' value. Here, it is assumed that the number of memory cells in which a synaptic weight is stored in one cell string and the number of sensing circuits connected to one bit line are 'k'. Then, the selection variable 'i' may be set to sequentially increase or decrease from '0' to 'k−1'. In another embodiment, the selection variable 'i' for the word line WL and the switch transistor SWT may be changed randomly.

In step S150, the word line decoder 130 and the switch decoder 140 select the word line WL and the switch transistor SWT corresponding to the word line count WL_cnt and the switch count SW_cnt set in the step S140. That is, the word line decoder 130 applies the read voltage Vrd to the word line WL<i> corresponding to the current word line count WL_cnt, and applies the read pass voltage Vread to the remaining word lines. In addition, the switch decoder 140 generates a switch selection signal SW<i> for turning on the switch transistor SWT corresponding to the current switch count SW_cnt. Then, the cell current corresponding to the synaptic weight stored in the selected memory cell is sensed by the sensing circuit SC<i>.

In step S160, an operation branch occurs according to whether the current word line count WL_cnt or the switch count SW_cnt is 'k'. Here, 'k' may correspond to the number of word lines or the number of sensing circuits. If the current word line count WL_cnt reaches 'k'(direction 'Yes'), all procedures are terminated. On the other hand, if the current word line count WL_cnt is not 'k' (direction 'No'), the procedure moves to step S165.

In step S165, the selection variable 'i' of the word line WL and the switch transistor SWT is increased by '1'. And the procedure moves to step S170.

In step S170, the string control circuit 120 and the word line decoder 130 detect a new input spike, and an operation branch occurs according to the detection result of a new input spike. If a new input spike is not detected (direction 'No'), the procedure moves to step S150. On the other hand, when a new input spike is detected (direction 'Yes'), the procedure moves to step S172.

In step S172, the value of the word line selection variable 'i' corresponding to the current word line count (WL_cnt) or the switch count (SW_cnt) is stored as an additional selection value 'R'. Afterwards, under the newly activated string selection signal S<j'>, when a word line is selected, a word line selection operation corresponding to the additional selection value 'R' will be added.

In step S174, a string selection signal S<j'> of a channel address corresponding to the newly detected input spike sp<j'> is allocated. That is, the cell string NS<j'> corresponding to the channel address of the detected input spike sp<j'> may be selected.

In step S176, the string control circuit 120 activates the string selection signal S<j'>. If the channel address corresponding to the input spike sp<3> corresponds to the cell string NS<3>, the string selection signal S<3> will be activated in response to the input spike. The string control circuit 120 activates the string selection signal S<j'> for a string selection time ΔT during which all memory cells included in the cell string can be read.

In step S178, the word line decoder 130 and the switch decoder 140 select the word line WL and the switch transistor SWT corresponding to the word line count WL_cnt and the switch count SW_cnt updated in step S165. For example, the word line decoder 130 applies the read voltage Vrd to the word line WL<i> corresponding to the current word line count WL_cnt, and applies the read pass voltage Vread to the remaining word lines. In addition, the switch decoder 140 generates a switch selection signal SW<i> for turning on the switch transistor SWT corresponding to the current switch count SW_cnt. Then, the cell current corresponding to the synaptic weight stored in the selected memory cell will be sensed by the sensing circuit SC<i>.

In step S180, an operation branch occurs according to whether the current word line count WL_cnt or the switch count SW_cnt is 'k'. Here, 'k' may correspond to the number of word lines or the number of sensing circuits. If the current word line count WL_cnt reaches 'k' (direction 'Yes'), the procedure moves to step S182. On the other hand, if the current word line count WL_cnt is not 'k' (direction 'No'), the procedure returns to step S178.

In step S182, the selection variable 'i' is initialized again. For example, the selection variable 'i' may be initialized to '0'. Here, 'i' is a word line selection variable designating a word line WL and a switch transistor SWT associated with the word line WL.

In step S184, the word line decoder 130 and the switch decoder 140 select the word line WL and the switch transistor SWT corresponding to the word line count WL_cnt and the switch count SW_cnt initialized in step S182. For example, the word line decoder 130 applies the read voltage Vrd to the word line WL<0> corresponding to the current word line count WL_cnt, and the read pass voltage Vread to the remaining word lines. In addition, the switch decoder 140 generates a switch selection signal SW<0> for turning on the switch transistor SWT corresponding to the current switch count SW_cnt. Then, the cell current corresponding to the synaptic weight stored in the selected memory cell will be sensed by the sensing circuit SC<0>.

In step S190, an operation branch occurs according to whether the current word line count (WL_cnt) or the switch count (SW_cnt) is the additional selection value 'R' stored in step S172. If the current word line count WL_cnt reaches 'R' (direction 'Yes'), all procedures may be terminated. On the other hand, if the current word line count WL_cnt is not 'R' (direction 'No'), the procedure moves to step S195.

In step S195, the selection variable 'i' of the word line WL and the switch transistor SWT is increased by '1'. And then, the procedure returns to step S184.

According to the operation of the string control circuit 120, the word line decoder 130, and the switch decoder 140 described above, the synaptic weight is reflected to the multiple simultaneous input spikes and transmitted to the sensing circuits 150. Due to the characteristics of multiple input spikes inputted simultaneously, selection of multiple cell strings NS<j> may also occur simultaneously.

Figure 7:
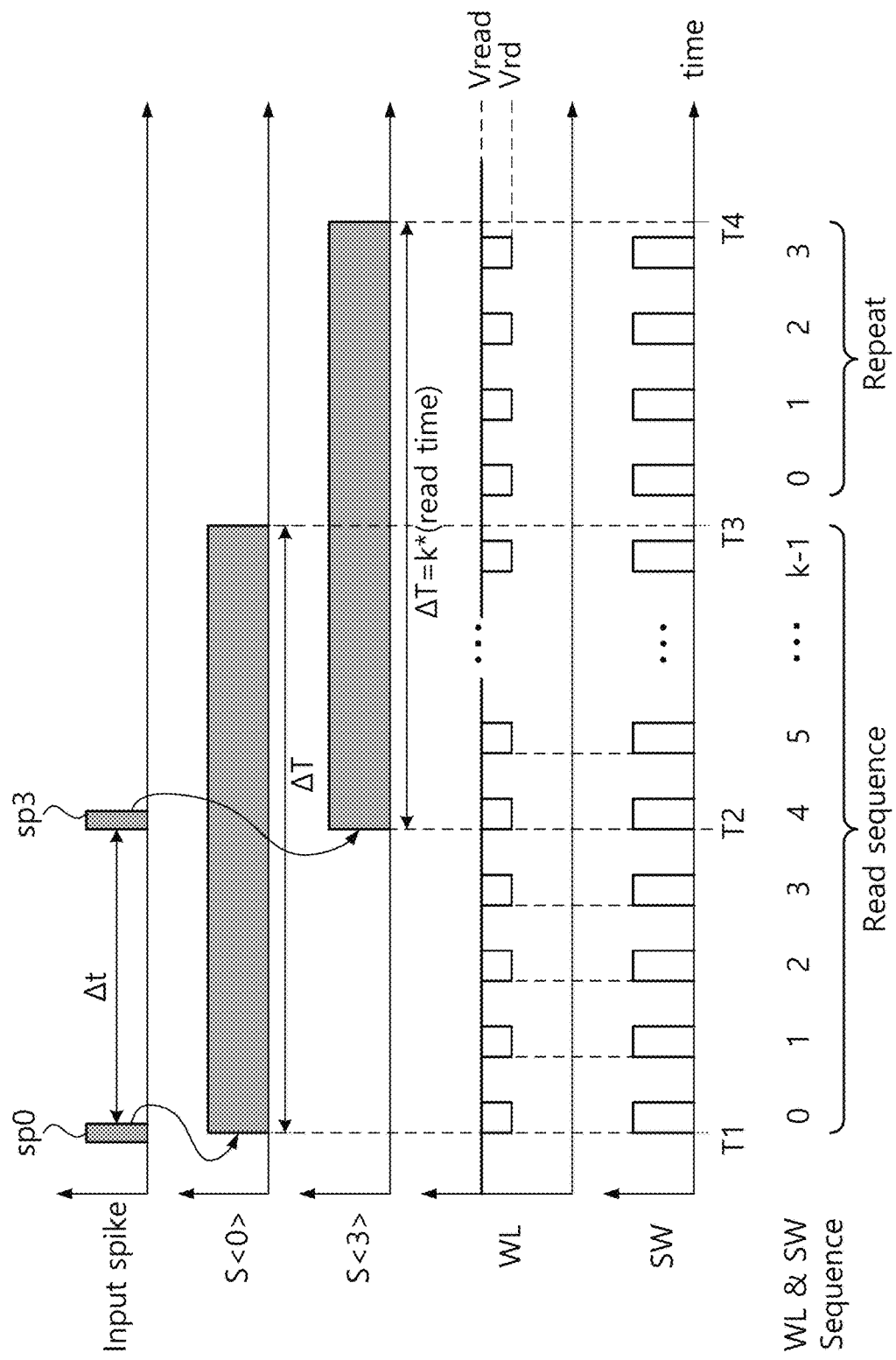
FIGS. 7 and 8 are timing diagrams illustrating operations of a string control circuit, a word line decoder, and a switch decoder according to an embodiment of the present invention.
Figure 8:
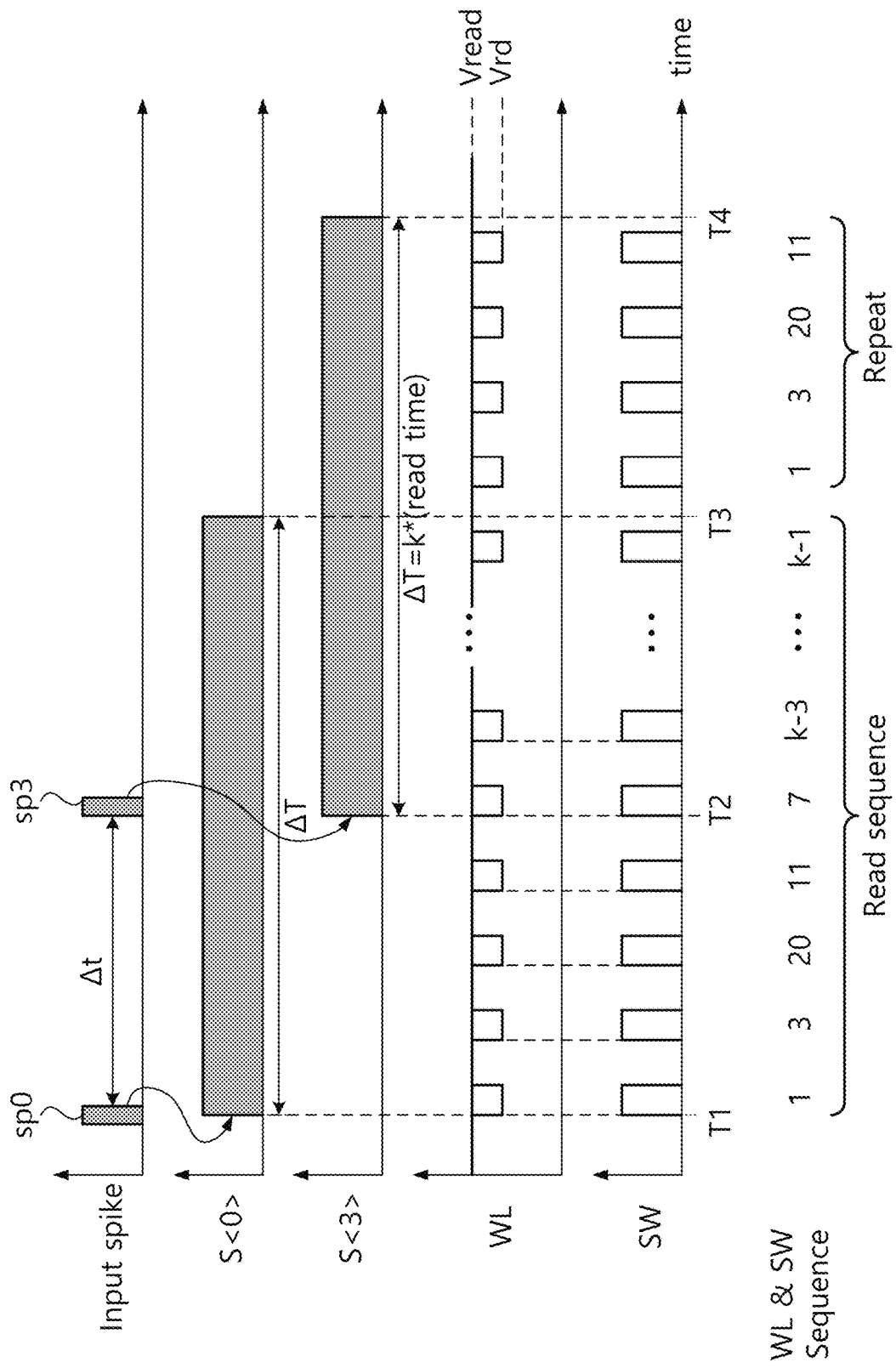

FIGS. 7 and 8 are timing diagrams illustrating operations of a string control circuit, a word line decoder, and a switch decoder according to an embodiment of the present invention. FIG. 7 shows an embodiment in which the word line WL and the sensing circuits SC are sequentially selected, and FIG. 8 shows an embodiment in which the word line WL and the sensing circuits SC are randomly selected.

Referring to FIG. 7, it is assumed that two input spikes sp0 and sp3 are input with a time interval Δt. For example, after the input spike sp0 occurs and the time interval Δt elapses, the subsequent input spike sp3 may occur. It is assumed that a time interval Δt between the two input spikes sp0 and sp3 is shorter than a string selection time ΔT required to sense all memory cells of one NAND cell string.

At time T1, the string control circuit 120 activates the string selection signal S<0> according to the detection of the input spike sp0. The cell string NS<0> is connected to the bit line BL by activation of the string selection signal S<0>. At the same time, the word line decoder 130 and the switch decoder 140 generate a word line voltage and a switch selection signal SW to select the word lines WL and the switch transistors SWT during the string selection time ΔT when the string selection signal S<0> is activated. The word line decoder 130 provides the read voltage Vrd to the selected word lines sequentially selected during the string selection time ΔT, and provides the read pass voltage Vread, Vrd<Vread) to the remaining word lines. The switch decoder 140 may generate a switch selection signal SW<i> for selecting the sensing circuit SC<i> in synchronization with the selected word line WL<i>.

The generation of the word line selection signal WL<i> and the switch selection signal SW<i> by the activation of the string selection signal S<0> is completed at the time T3 when the string selection time ΔT ends. However, a new input spike sp3 may occur at a time T2 before the string selection time ΔT ends. Accordingly, at time T2, the string control circuit 120 also activates the string selection signal S<3> while the string selection signal S<0> is still activated. The cell string NS<3> is connected to the bit line BL by activation of the string selection signal S<3>. Accordingly, between time points T2 and T3, the two cell strings NS<0> and NS<3> are simultaneously connected to the bit line BL, and the combined cell current of the cell string NS<0> and the cell string NS<3> are sensed by a sensing circuit SC<i> corresponding to a selected word line WL<i>. Though an example showing two cell strings simultaneously connected to the bit line BL, more than two cell strings can be simultaneously connected to the bit line BL, such that a combined cell current of more than two cell strings can be sensed corresponding to a selected word line WL<i>.

In the period T2 to T3, the word line decoder 130 and the switch decoder 140 continue the operation of selecting the word line WL and the switch transistors SWT, which are performed before the time T2. However, since the string selection signal S<3> is already activated, the memory cells of the cell string NS<3> may be sequentially selected starting from the word line WL<4>. That is, the word line WL and the switch transistors SWT of the cell string NS<3> start to be activated from the word line WL<4> and the switch selection signal SW<4>.

At a time T3, the string selection signal S<0> is deactivated (Low), and the cell string NS<0> is electrically cut off from the bit line. However, since the string selection signal S<3> is still active, sensing of the cell string NS<3> continues. That is, at the time T2, the word line WL<4> and the switch selection signal SW<4> of the cell string NS<3> started to be selected. Accordingly, during the remaining extra time of the string selection time ΔT, the selection of the word lines WL<0> to WL<3> and the application of the switch selection signals SW<0> to SW<3> should be further preformed. The generation of the additional word line WL and the switch selection signal SW<i> is terminated at a time T4 when the string selection signal S<3> is deactivated.

Referring to FIG. 8, it is shown that the selection order of the word line WL and the switch selection transistor SWT is not necessarily sequential. For example, the numbers "0" through "k–1" included for word lines and switch selection signals and transistors in the examples given herein are intended to describe sequential physical word lines (e.g., word lines physically sequentially arranged). In the above embodiment, word lines and cell selection transistors are selected in sequential physical order. However, other orders may be used. For example, the timing diagram of FIG. 8 shows that the selection order of the word line WL and the switch selection transistor SWT may be randomly provided compared to the timing diagram of FIG. 7. When one cell string is activated, each of the word lines WL in the cell string only needs to be selected once, and each of the switch selection transistors SWT for transferring the cell current to the sensing circuits only needs to be selected once during the string selection time ΔT. In this case, the word line WL and the switch selection transistor SWT associated with each other are selected and activated in synchronization, but not in physical sequential order.

Figure 9:
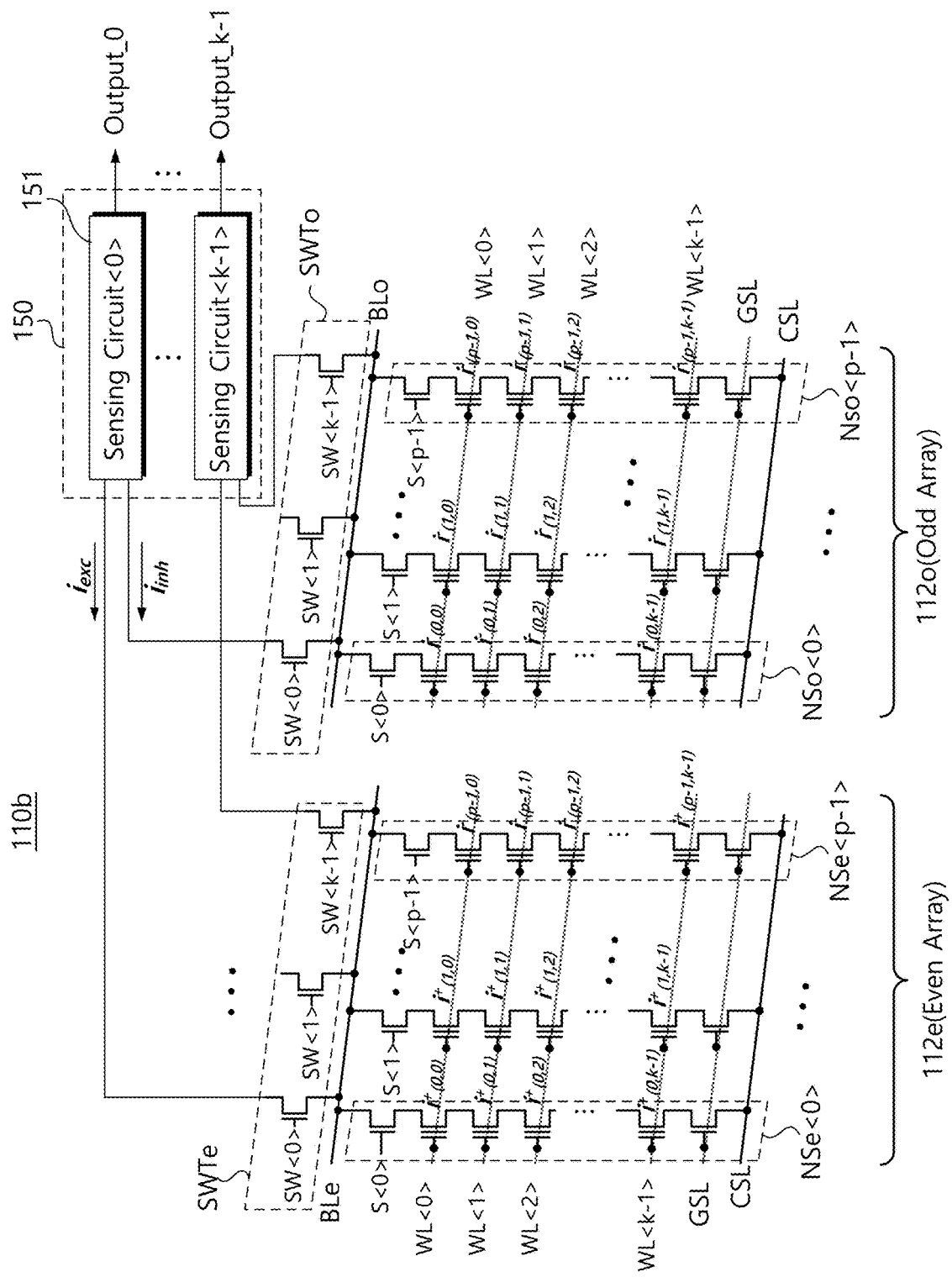
FIG. 9 is a circuit diagram showing a synapse array and a sensing circuit according to another embodiment of the present invention.

FIG. 9 is a circuit diagram showing a synapse array and a sensing circuit according to another embodiment of the present invention. Referring to FIG. 9, the synapse array 110b includes a plurality of cell strings NSe<0> to NSe<p–1> and NSo<0> to NSo<p–1> connected to each of the bit line pairs BLe and Blo, and switch transistors SWTe and SWTo connecting the bit line pairs BLe and BLo to the sensing circuit unit 150, respectively. The synapse array 110b may be provided in the form of a pair of an even array 112e and an odd array 112o.

When the input spike is provided, the string selection signal S<j> corresponding to the channel address of the input spike sp<j> is activated by the string selection circuit 120 (refer to FIG. 2). If the input spike sp<0> is provided, the string selection signal S<0> may be activated (or logic high). By activation of the string selection signal S<0>, the string select transistor SST<0> of each of the cell string NSe<0> and the cell strings NSo<0> are turned on during the string selection time ΔT. Then, the cell string NSe<0>, which may be coupled to the even bit line BLe, is connected to the even bit line BLe, and the cell string NSo<0>, which may be coupled to the odd bit line BLo, is connected to the odd bit line BLo, respectively. The word "coupled" is used herein to indicate a physical connection between components, and may refer to a direct coupling, or indirect coupling.

Subsequently, the word line decoder 130 (refer to FIG. 2) sequentially applies a read voltage to each of the word lines WL<0> to WL<k-1> during the string selection time ΔT. The word lines WL<i> of the even array 112e and the odd array 112o of the same layer are electrically connected to each other. Accordingly, the memory cells located in the same word line layer of the cell string NSe<0> and the cell string NSo<0> are selected at the same time according to the sequential selection of the word lines WL<0> to WL<k-1>.

In synchronization with the sequential selection of the word lines WL<0> to WL<k-1>, the switch decoder 140 (refer to FIG. 2) also sequentially activates the switch selection signals SW<0> to SW<k-1>. Then, the stimulation current $i_{exc}$ corresponding to the synaptic weights stored in the even cell string NSe<0> is sequentially transmitted to the sensing circuits SC<0> to SC<k-1>. At the same time, the inhibition current $i_{inh}$ corresponding to the synaptic weights stored in the odd cell string NSo<0> is sequentially transmitted to the sensing circuits SC<0> to SC<k-1>. The stimulation current $i_{exc}$ increases the membrane potential Vmem formed according to the accumulation of currents in each of the sensing circuits SC<0> to SC<k-1>, and the inhibition current $i_{inh}$ decreases the membrane potential Vmem formed according to the accumulation of currents in each of the sensing circuits SC<0> to SC<k-1>. The magnitude of the stimulation current $i_{exc}$ is determined by the stimulation weight $i^+_{(i,j)}$ stored in the memory cells of the even cell strings NSe<0> to NSe<p-1>. The magnitude of the inhibition current him is determined by the suppression weight $i^-_{(i,j)}$ stored in the memory cells of the odd cell strings NSo<0> to NSo<p-1>.

If the string selection signal S<1> is activated by another input spike, the even and odd NAND cell strings NSe<1> and NSo<1> are respectively connected to the bit line pair BLe and BLo during the string selection time ΔT. Then, stimulation current $i_{exc}$ and the inhibition current $i_{inh}$ corresponding to the stimulation weight $i^+_{(i,j)}$ and suppression weight $i^-_{(i,j)}$ of the even and odd NAND cell strings (NSe<1>, NSo<1>) are transmitted to the sensing circuits SC<0> to SC<k-1> during the string selection time ΔT.

Each of the sensing circuits SC<0> to SC<k-1> of the sensing circuit unit 150 integrates a stimulation current $i_{exc}$ sequentially provided through the even switch transistors SWTe and the inhibition current $i_{inh}$ sequentially provided through the odd switch transistors SWTo. That is, when the word line WL<0> is selected, the sensing circuit 151, adds the stimulation current $i_{exc}$ generated in the even bit line BLe and the inhibition current $i_{inh}$ generated in the odd bit line BLo to generate an output signal Output_0.

Each of the sensing circuits SC<0> to SC<k-1> generates an output signal Output_0 to Output_k-1 according to the level of the membrane potential Vmem formed according to the stimulation current $i_{exc}$ and the inhibition current $i_{inh}$. For example, in one embodiment, each of the sensing circuits SC<0> to SC<k-1> generates an output spike when the level of the membrane potential Vmem exceeds the threshold Vsth. The configuration and function of each of the sensing circuits SC<0> to SC<k-1> will be described in detail with reference to the drawings to be described later.

According to the above-described structure, the synaptic weight stored in each of the cell strings is converted into a stimulation current $i_{exc}$ and an inhibition current $i_{inh}$ to each of the sensing circuits SC<0> to SC<k-1> in response to the input spike. The sensing circuits SC<0> to SC<k-1> may generate an output spike by summing the stimulation current $i_{exc}$ and the inhibition current $i_{inh}$.

Figure 10:
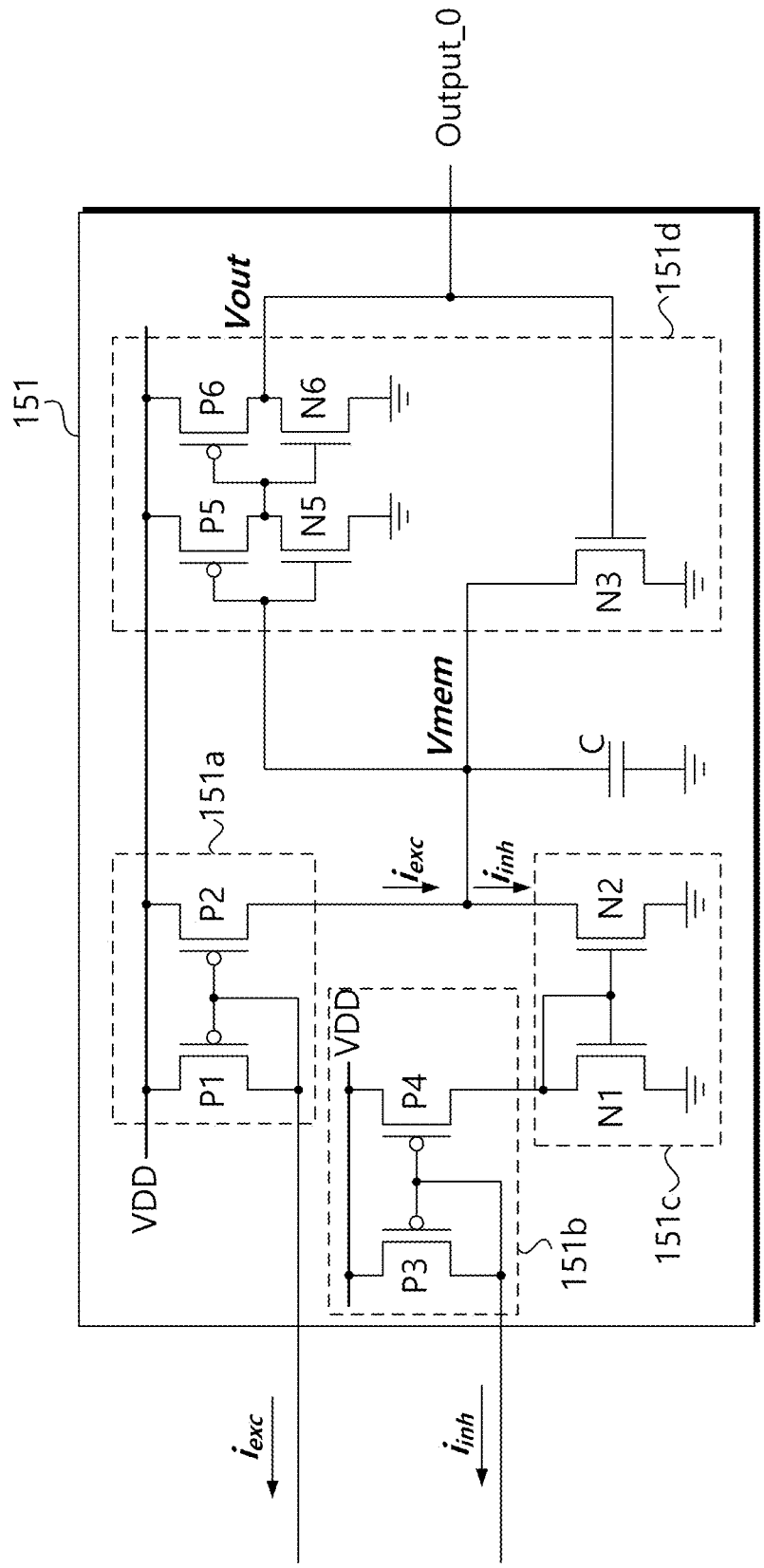
FIG. 10 is a circuit diagram exemplarily showing a detailed configuration of the sensing circuit of FIG. 9.

FIG. 10 is a circuit diagram exemplarily showing a detailed configuration of the sensing circuit of FIG. 9. Referring to FIG. 10, the sensing circuit 151 (SC<0>) may include current mirrors 151a, 151b, and 151c, a pulse generator 151d, and a capacitor C. The sensing circuit 151 senses a stimulus current $i_{exc}$ by a stimulation weight $i^+_{(0,j)}$ and an inhibition current $i_{inh}$ by a suppression weight $i^-_{(0,j)}$ stored in memory cells connected to the word line WL<0>. Similarly, although not shown, the sensing circuit SC<k-1> senses a stimulus current $i_{exc}$ by a stimulation weight $i^+_{(k-1,j)}$ and an inhibition current $i_{inh}$ by a suppression weight $i^-_{(k-1,j)}$ stored in memory cells connected to the word line WL<k-1> to generate output signal Output_k-1. The configuration of the sensing circuits 151 described below is equally applied to the remaining sensing circuits SC<1> to SC<k-1>.

The current mirrors 151a, 151b, and 151c transfer the excitation current $i_{exc}$ and the inhibition current $i_{inh}$ flowing from each of the even and odd cell strings NSe<0> and NSo<0> to the membrane potential Vmem node. Each of the excitation current and the inhibition current $i_{inh}$ corresponds to a synaptic weight value provided by the stimulation weight $i^+_{(0,j)}$ and the inhibition weight $i^-_{(0,j)}$. The current mirror 151a composed of two PMOS transistors charges the membrane potential Vmem node by mirroring the excitation current transmitted through the even bit line BLe. As the magnitude of the stimulation current increases, the level of the membrane potential Vmem will increase. The current mirrors 151b and 151c composed of two PMOS transistors and two NMOS transistors discharge the membrane potential Vmem node according to the inhibition current $i_{inh}$ transmitted through the odd bit line BLo. As the magnitude of the inhibition current $i_{inh}$ increases, the level of the membrane potential Vmem will fall faster.

The pulse generator 151d generates an output spike when the level of the membrane potential Vmem exceeds the threshold Vsth. The pulse generator 151d may include first inverter (P5 and N5) and second inverter (P6 and N6) that compare the level of the membrane potential Vmem with the threshold Vsth. And the pulse generator 151d includes a discharge transistor N3. The discharge transistor N3 discharges the membrane potential Vmem node according to the level of the output voltage Vout formed at the output terminals of the second inverter (P6 and N6). Accordingly, when the level of the membrane potential Vmem is higher than the threshold Vsth, the output signal Output_0 is output in the form of a pulse.

When the level of the membrane potential Vmem corresponding to the sum of the stimulation current $i_{exc}$ and the inhibition current $i_{inh}$ is higher than the threshold value Vsth corresponding to the trip voltage of the first inverter (P5 and N5), the output voltage Vout transitions to high level. Subsequently, the discharge transistor N3 is turned on in response to the output voltage Vout transitioned to a high level. Then, the membrane potential (Vmem) node is discharged to the ground level Vss, the output voltage Vout will transition back to the low level. According to this scheme, the output signal Output_0 may be provided in the form of an output spike in the form of a pulse according to the level of the membrane potential Vmem.

As described above, the function of the sensing circuit 151, which forms the membrane potential Vmem by the stimulation current $i_{exc}$ and the inhibition current $i_{inh}$ and generates an output spike according to the level of the membrane potential Vmem, may be changed in various forms or methods.

Figure 11:
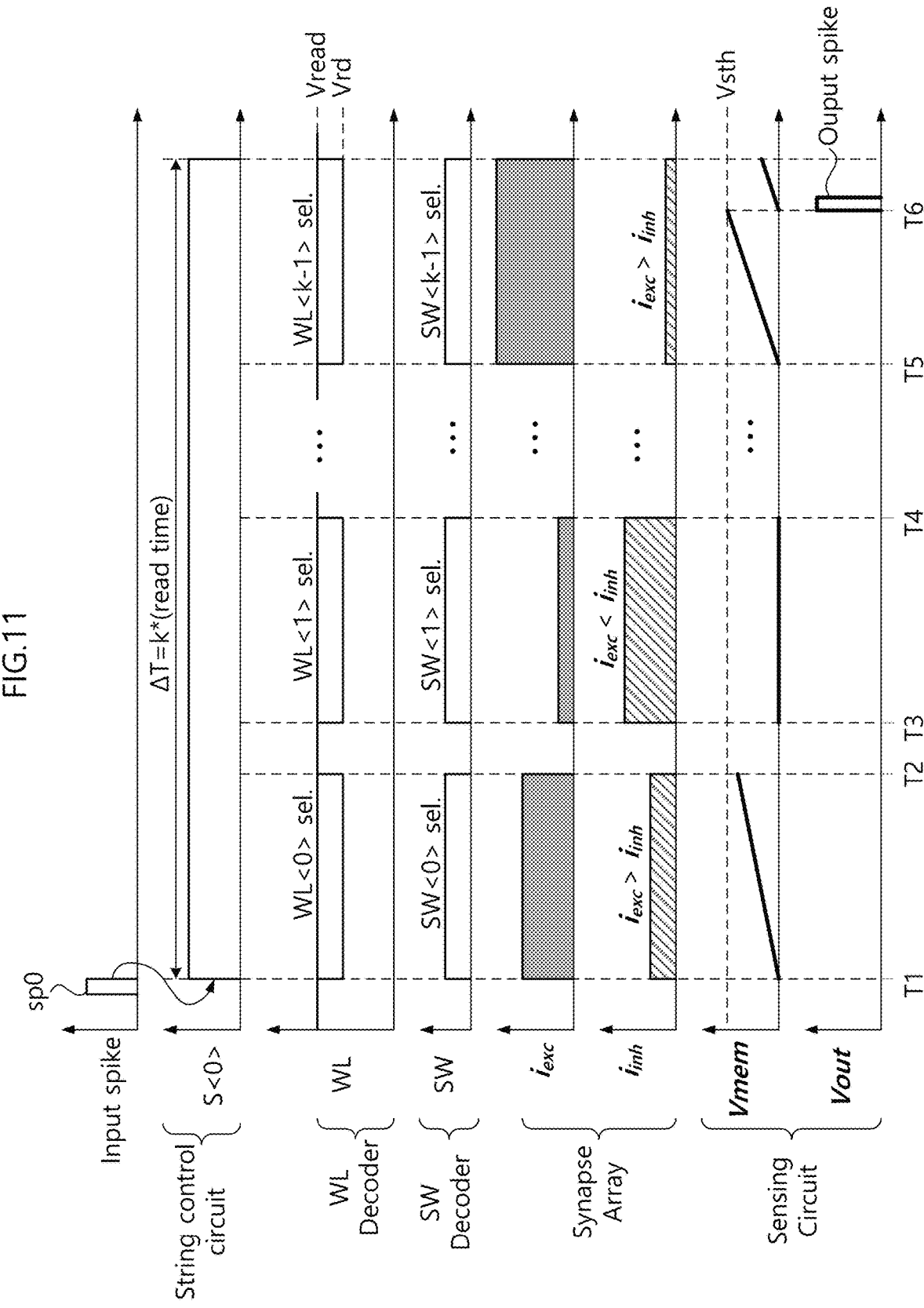
FIG. 11 is a timing diagram exemplarily illustrating an operation of the sensing circuit of FIG. 10.

FIG. 11 is a timing diagram exemplarily illustrating an operation of the sensing circuit of FIG. 10. Referring to FIGS. 9 to 11, when one input spike sp0 is input, memory cells of the synapse arrays 112e and 112o are selected, and the stimulation current $i_{exc}$ and the inhibition current $i_{inh}$ from the selected memory cells are transmitted to the sensing circuit 151(SC<0>). The sensing circuit 151 may integrate the stimulation current $i_{exc}$ and the inhibition current $i_{inh}$ and fire as an output spike. Here, although only one input spike sp0 is illustrated as an example, the operation of the sensing circuit 151, which will be described later, is equally applied even if multiple input spikes are provided simultaneously.

At a time T1, the string control circuit 120 activates the string selection signal S<0> according to the detection of the input spike sp0. By activation of the string selection signal S<0>, the even cell string NSe<0> is connected to the even bit line BLe, and the odd cell string NSo<0> is connected to the odd bit line BLo. The word line decoder 130 and the switch decoder 140 generate the word line voltage WL and the switch selection signal SW during the string selection time ΔT when the string selection signal S<0> is activated. The word line voltage WL and the switch selection signal SW are equally provided to each of the synapse arrays 112e and 112o.

When 'k' memory cells are connected in series in one cell string, the word line decoder 130 applies the read voltage Vrd to the selected word line and the read pass voltage Vread to the other word lines during the string selection time ΔT. In synchronization with the selection of the word line, the switch decoder 140 will generate a switch selection signal SW<i> for selecting the sensing circuit SC<i> corresponding to the selected word line WL<i>.

Again, the stimulation current $i_{exc}$ sensed from the memory cells connected to the word line WL<0> by the sensing circuit SC<0> at the time T1 may be expressed by Equation 1 below.

$$i_{exc} = \sum_{j=0}^{p-1} S(j) * i^+_{(j,0)}$$ [Equation 1]

Here, S(j) represents the string selection signal S<j> of all strings turned on by the input spike. For example, S(j) may be '1' when turned on and '0' when turned off. '$i^+_{(j,0)}$' denotes a cell current flowing through each of the memory cells of the even array 112e connected to the word line WL<0>. When only the string selection signal S<0> is activated, only the cell current of the cell string NSe<0> will contribute to the stimulation current $i_{exc}$.

On the other hand, the inhibition current $i_{inh}$ sensed by the sensing circuit SC<0> may be expressed by Equation 2 below.

$$i_{inh} = \sum_{j=0}^{p-1} S(j) * i^-_{(j,0)}$$ [Equation 2]

Here, means a cell current of each of the strings of the odd array 112o connected to the word line WL<0>.

It can be seen that, at time T1, the magnitude of the stimulation current $i_{exc}$ by the memory cells of the word line WL<0> is greater than the inhibition current $i_{inh}$. In this case, the membrane potential Vmem formed in the sensing circuit SC<0> gradually increases as shown. However, the magnitude of the membrane potential (Vmem) does not exceed the threshold value Vsth. Accordingly, sensing of the memory cells of the word line WL<0> is terminated at time T2.

At time T3, the stimulation current $i_{exc}$ and the inhibition current $i_{inh}$ by the memory cells of the word line WL<1> of the synapse arrays 112e and 112o are sensed. At this point, it can be seen that the magnitude of the stimulation current is smaller than the inhibition current $i_{inh}$. In this case, the membrane potential Vmem formed in the sensing circuit SC<0> maintains the ground level (or 0V) as shown. Accordingly, no output spike occurs at time points T3 to T4.

At time T5, the stimulation current $i_{exc}$ and the inhibition current $i_{inh}$ by the memory cells of the word line WL<k−1> are sensed. In particular, in this case, it can be seen that the magnitude of the stimulation current is much larger than the inhibition current $i_{inh}$. In this case, the increasing slope of the membrane potential Vmem formed in the sensing circuit SC<0> is sharper than at the time T1. And the magnitude of the membrane potential (Vmem) at the time T6 exceeds the threshold value (Vsth). Accordingly, the pulse generator 151d of the sensing circuit SC<0> generates an output spike at time T6. And the membrane potential Vmem is initialized by the discharge transistor N3. The initialized membrane potential Vmem rises again in a section in which the stimulation current is greater than the inhibition current $i_{inh}$.

Figure 12:
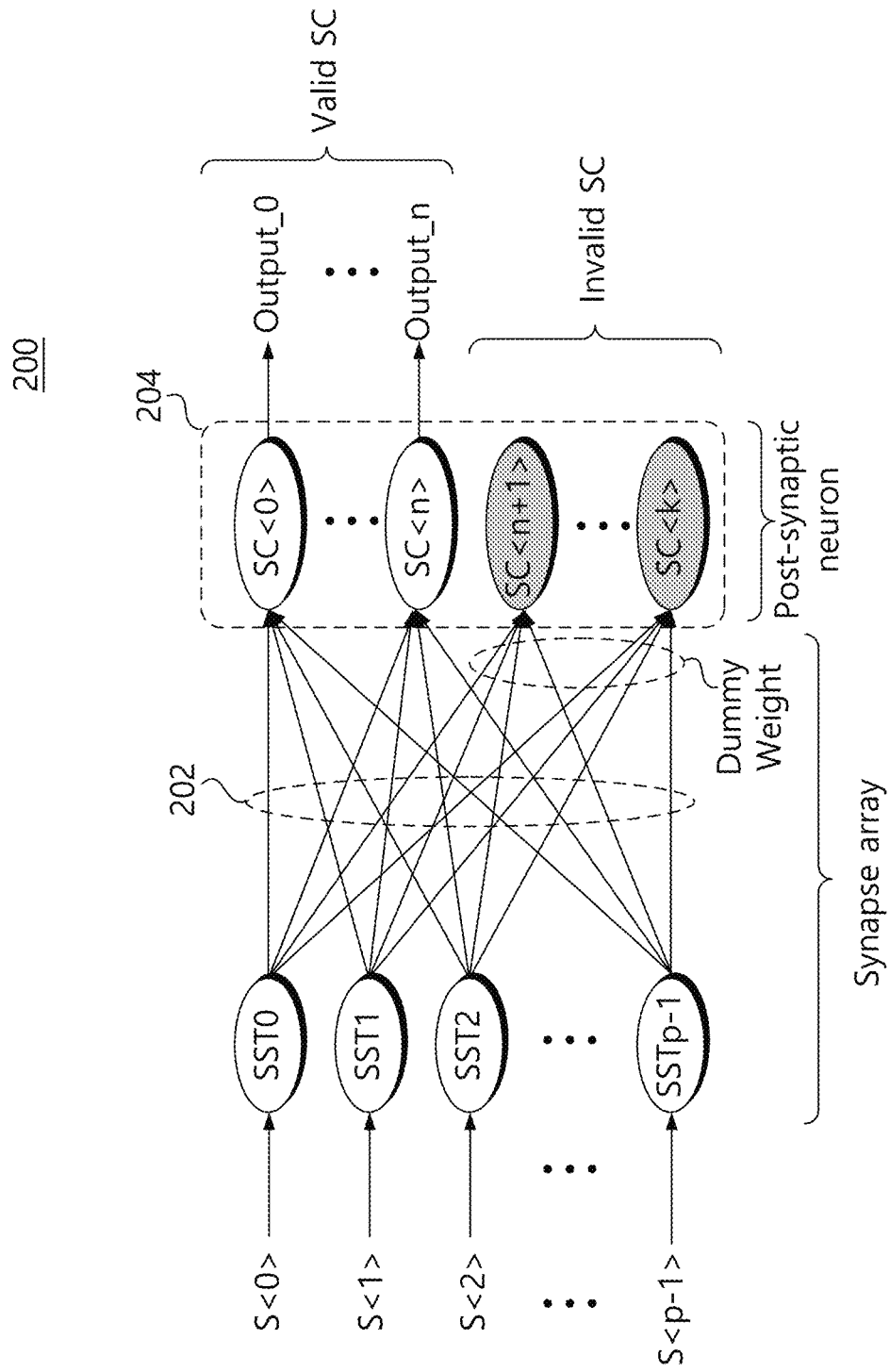
FIG. 12 is a diagram schematically illustrating a spiking neural network SNN model according to another embodiment of the present invention.

FIG. 12 is a diagram schematically illustrating a spiking neural network SNN model according to another embodiment of the present invention. Referring to FIG. 12, even when the number of post-synaptic neurons 204 or the number of output nodes in the spiking neural network SNN is less than the number of actual word lines (k), it can be implemented in a vertically stacked flash memory through a weight program.

The spiking neural network 200 may be modeled as a synapse array 202 receiving a string selection signal (S<j>) and a post-synaptic neuron 204. In addition, the post-synaptic neuron 204 may correspond to the sensing circuits SC<0> to SC<n> that accumulate synaptic weights and are responsible for firing. Here, the configuration of a pre-synaptic neuron 12 (see FIG. 1) generating an input spike or a control circuit 14 (see FIG. 1) generating a string selection signal (S<j>) from the input spike is substantially shown in FIG. 1. Accordingly, the illustration and description of these components will be skipped.

A corresponding NAND cell string may be connected to the bit line BLe or BLo by the string selection signal S<j>. That is, when the string selects signal S<1> is activated, the string select transistor SST1 is turned on, and the corresponding NAND cell string NS<1> is connected to the bit line BL. Then, synaptic weights related to the NAND cell string NS<1> are reflected through the synapse array 202 and transmitted to the post-synaptic neuron 204.

The post-synaptic neuron 204 may include 'k+1' neurons or output nodes for accumulating synaptic weights transmitted through the synapse array 202. The post-synaptic neuron 204 may be implemented as, for example, sensing circuits SC<0> to SC<k> that accumulate a cell current which reflect a synaptic weight and fire. The post-synaptic neuron 204 fires an output spike according to the accumulated cell current. Here, when the number of word lines WL is 'k+1', the sense circuits SC<0> to SC<k> may also be formed as 'k+1'. And when 'k+1' neurons are included in the post-synaptic neuron 204, 'k+1' output spikes Output_0 to Output_k may occur simultaneously or multiple.

However, there is a case where the number of memory cells or the number of word lines (WLs) can support 'k+1' post-synaptic neurons 204, but the number of output nodes of the post-synaptic neurons 204 actually used is less than 'k+1'. That is, it can be assumed that only 'n+1', which is less than 'k+1', the number of post-synaptic neurons 204 are used. In this case, by programming unused synaptic weights of the synapse array 202 as a dummy value, a corresponding spiking neural network (SNN) may be implemented in the V-NAND flash memory.

When memory cells programmed with a dummy weight are selected, the same current flows through the even string and the odd string. Accordingly, the stimulation current and the inhibition current $i_{inh}$ have the same magnitude, and the output of the sensing circuits SC<n+1> to SC<k> is not generated. As a result, the sensing circuits SC<0> to SC<n> that detect memory cells (or word lines) that are not programmed with the dummy weight are valid sensing circuits (Valid SC), and the sensing circuits SC<n+1> to SC<k> for sensing memory cells (or word lines) programmed with the dummy weight may be designated as invalid sensing circuits (Invalid SC).

As described above, it is possible to reconfigure the synapse array 202 by programming the memory cells with a dummy weight. Using this technique, the number of post-synaptic neurons 204 or the number of output nodes can be freely adjusted in a spiking neural network SNN based on V-NAND flash memory.

Figure 13:
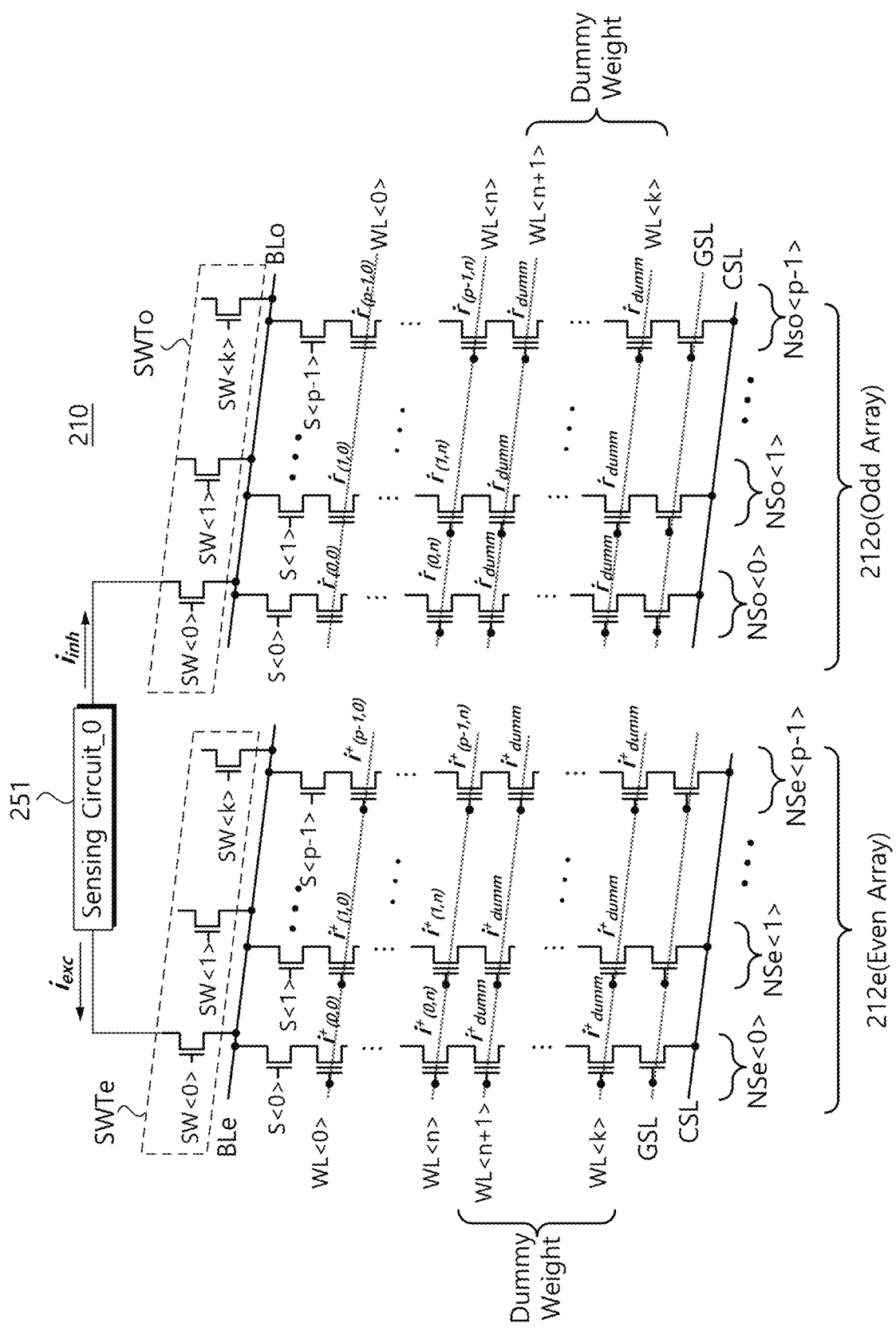
FIG. 13 is a circuit diagram illustrating a method of reconfiguring a synapse array for implementing the spiking neural network SNN of FIG. 12.

FIG. 13 is a circuit diagram illustrating a method of reconfiguring a synapse array for implementing the spiking neural network SNN of FIG. 12. Referring to FIG. 13, when the number of sensing circuits or post-synaptic neurons is less than the number of word lines, the spiking neural network SNN may be reconfigured by programming dummy weights of memory cells.

The synapse array 210 includes a plurality of NAND cell strings (NSe<0> to NSe<p-1>, NSo<0> to NSo<p-1>) connected to each bit line pair (BLe, BLo), and switch transistors SWTe and SWTo respectively connecting the bit line pair BLe and BLo to the sensing circuit unit 150. The synapse array 210 may be provided in the form of a pair of an even array 212e and an odd array 212o. The number of word lines WL or the number of sensing circuits SC constituting the synapse array 210 is 'k+1'. However, the number of post-synaptic neurons 204 actually used in the spiking neural network SNN may be 'n+1', which is less than 'k+1'. In this case, normal weights ($i^+_{(j, i)}$, $i^-_{(j, i)}$) may be stored in memory cells of the word lines WL<0> to WL<n>. On the other hand, dummy weights ($i^+_{dumm}$, $i^-_{dumm}$) may be stored in memory cells of the word lines WL<n+1> to WL<k>.

The switch selection signals SW<0> to SW<k> may be sequentially activated in synchronization with the sequential selection of the word lines WL<0> to WL<k>. Then, the stimulation current $i_{exc}$ corresponding to the synaptic weights stored in the even cell string NSe<0> is sequentially transmitted to the sensing circuits SC<0> to SC<k>. At the same time, the inhibition current $i_{inh}$ corresponding to the synaptic weights stored in the odd cell string NSo<0> is sequentially transmitted to the sensing circuits SC<0> to SC<k>. The stimulation current $i_{exc}$ increases the membrane potential Vmem of the sensing circuit 251 formed according to the accumulation of currents in each of the sensing circuits SC<0> to SC<k>. In addition, the inhibition current $i_{inh}$ reduces the membrane potential Vmem of the sensing circuit 251 formed according to the accumulation of currents in each of the sensing circuits SC<0> to SC<k>. However, when the word lines WL<n+1> to WL<k> corresponding to the dummy weights ($i^+_{dumm}$, $i^-_{dumm}$) are selected, the stimulation current $i_{exc}$ and the inhibition current $i_{inh}$ are provided with the same value. Accordingly, when the word lines WL<n+1> to WL<k> are selected, the membrane potential Vmem set in each of the sensing circuits SC<n+1> to SC<k> is constant, and outputs of the sensing circuits SC<n+1> to SC<k> are invalidated or blocked.

As mentioned above, a reconfiguration method of a spiking neural network SNN when the number of sensing circuits SC<i> or post-synaptic neurons 204 (refer to FIG. 11) is less than the number of word lines has been described. Accordingly, through the setting of synaptic weights (i.e., dummy weights) stored in the synapse array 202 (refer to FIG. 11), reconfiguration of a spiking neural network SNN capable of reducing the number of output nodes is possible.

Figure 14:
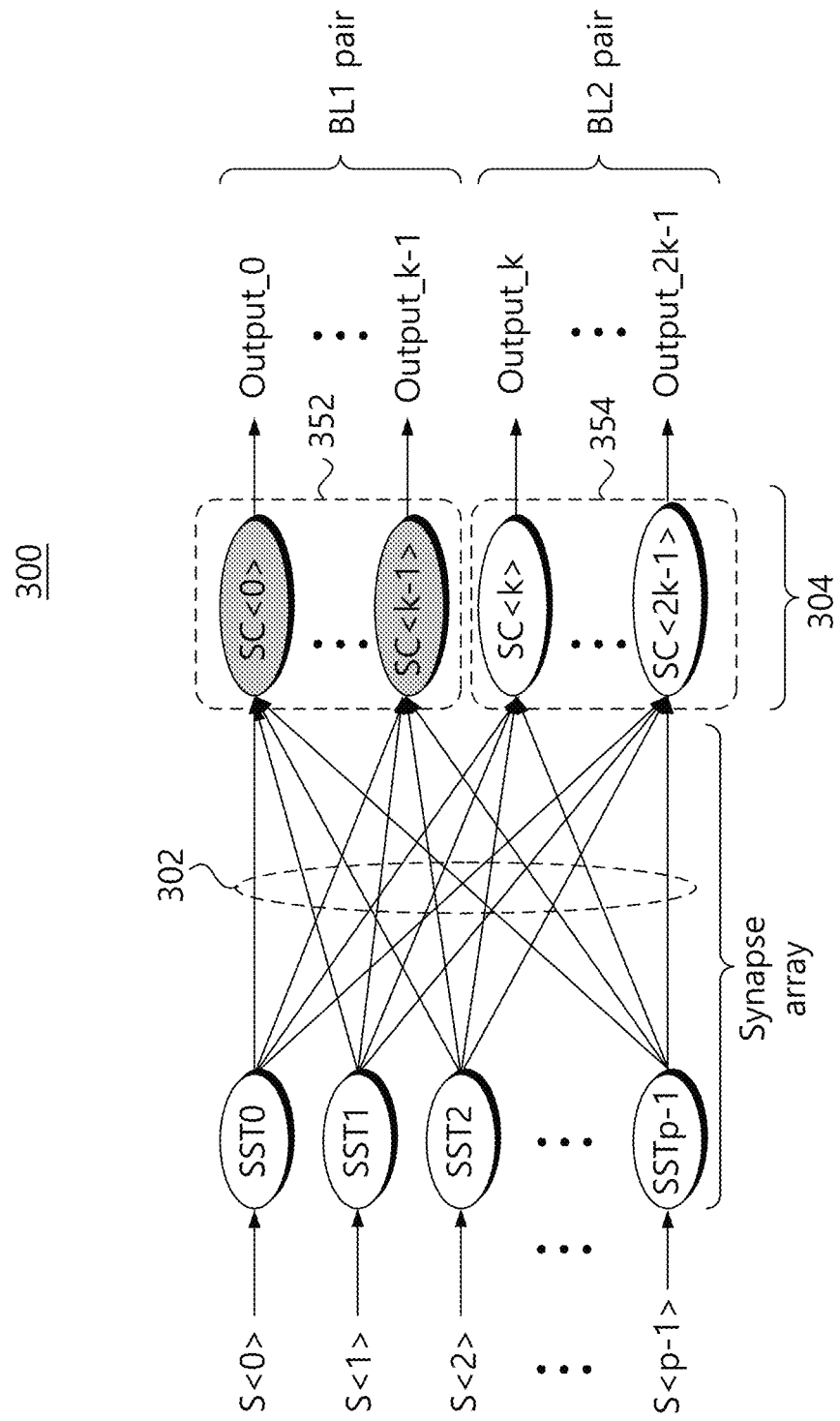
FIG. 14 is a diagram schematically illustrating a spiking neural network SNN model according to another embodiment of the present invention.

FIG. 14 is a diagram schematically illustrating a spiking neural network SNN model according to another embodiment of the present invention. Referring to FIG. 14, there is a case in which the number of post-synaptic neurons 304 or the number of output nodes (e.g., 2k) in the spiking neural network 300 (SNN) is greater than the number of word lines (k). In this case, the synapse array 302 can be reconfigured into a fully connected layer by using memory cells connected to another bit line pair (BL Pair) in the memory block.

The spiking neural network 300 may be modeled as a synapse array 302 and a post-synaptic neuron 304 receiving a string selection signal S<j>. In addition, the post-synaptic neuron 304 may correspond to the sensing circuits 352 and 354 in charge of accumulating synaptic weights and firing. Here, the first sensing circuit unit 352 may correspond to k switch transistors SWT and sensing circuits SC<0> to SC<k-1>. And in the spiking neural network 300, since the number of output nodes (2k) is greater than the number of word lines (k), a second sensing circuit unit 354 using a new bit line pair (BL2 pair) can be added as an output node. The second sensing circuit unit 354 that can be added through reconfiguration may correspond to k switch transistors SWT and sensing circuits SC<k> to SC<2k-1>.

Figure 15:
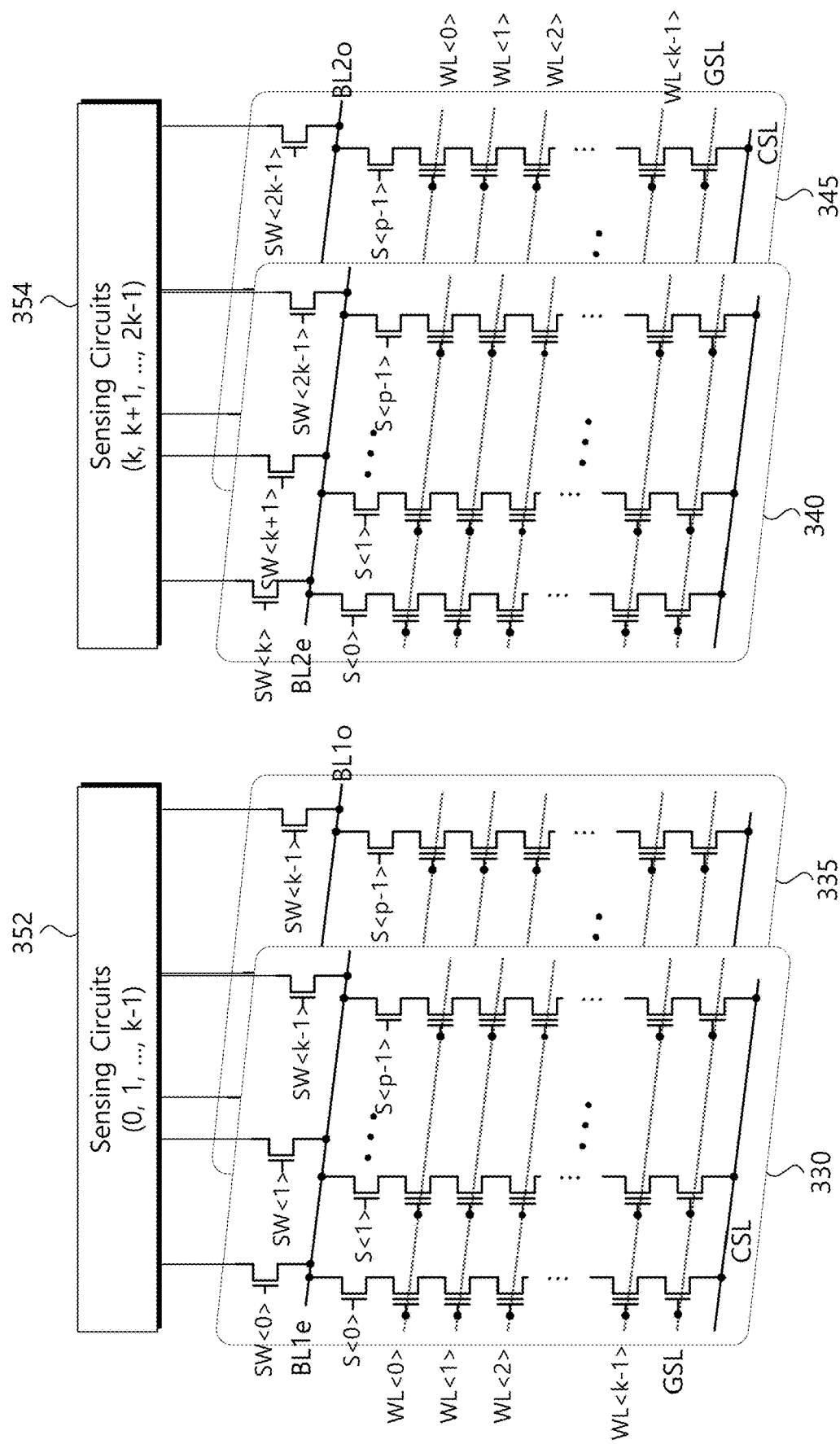
FIG. 15 is a circuit diagram illustrating a method of reconfiguring a synapse array for implementing the spiking neural network SNN of FIG. 14.

FIG. 15 is a circuit diagram illustrating a method of reconfiguring a synapse array for implementing the spiking neural network SNN of FIG. 14. Referring to FIG. 15, when the number of sensing circuits or post-synaptic neurons 304 (see FIG. 14) is greater than the number of word lines (k), another pair of bit lines (BL2e, BL2o) in the same memory block and a memory connected thereto arrays can be used to expand the number of output nodes. In addition, the number of sensing circuits 354 corresponding to the expanded number of output nodes may be increased.

The synapse arrays 330 and 335 include a plurality of NAND cell strings connected to each of the bit line pairs BL1e and BL1o, and switch transistors SWTe, SWTo connecting the bit line pairs BLe and BLo to the sensing circuit unit 352, respectively. Each of the bit line pairs BL1e and BL1o of the synapse arrays 330 and 335 are connected to k sense circuit units 352 to form 'k' output nodes. However, if more output nodes are required, an additional cell array included in the same memory block as the synapse arrays 330 and 335 and connected to different bit line pairs BL2e and BL2o may be used. For example, the additional synapse arrays 340 and 345 and the sensing circuit unit 354 connected to other bit line pairs BL2e and BL2o may provide 'k' additional output nodes.

Here, each of the synapse arrays 330, 335, 340, and 345 is selected and sensed by the same word line voltage WL<i> and the string selection signal S<j>. On the other hand, the synapse arrays 330 and 335 and the additional synapse arrays 340 and 345 are connected to the sensing circuits 352 and 354 by the different switch selection signals SW<0>— SW<k-1>, SW<k>~SW<2k-1>. That is, the synapse arrays 330 and 335 are connected to the sensing circuit unit 352 by the switch selection signals SW<0> to SW<k-1>, whereas the additional synapse arrays 340 and 345 are connected to the sensing circuit unit 354 by switch selection signals SW<k> to SW<2k-1>. Accordingly, the switch decoder 140 (refer to FIG. 2) generates additional switch selection signals SW<k> to SW<2k-1> for connecting the other bit line pairs BL2e and BL2o to the sensing circuit unit 354.

According to the above embodiment, when an additional output node needs to be configured, the spiking neural network SNN can be reconfigured by using a cell array corresponding to another bit line provided in the same memory block.

Figure 16:
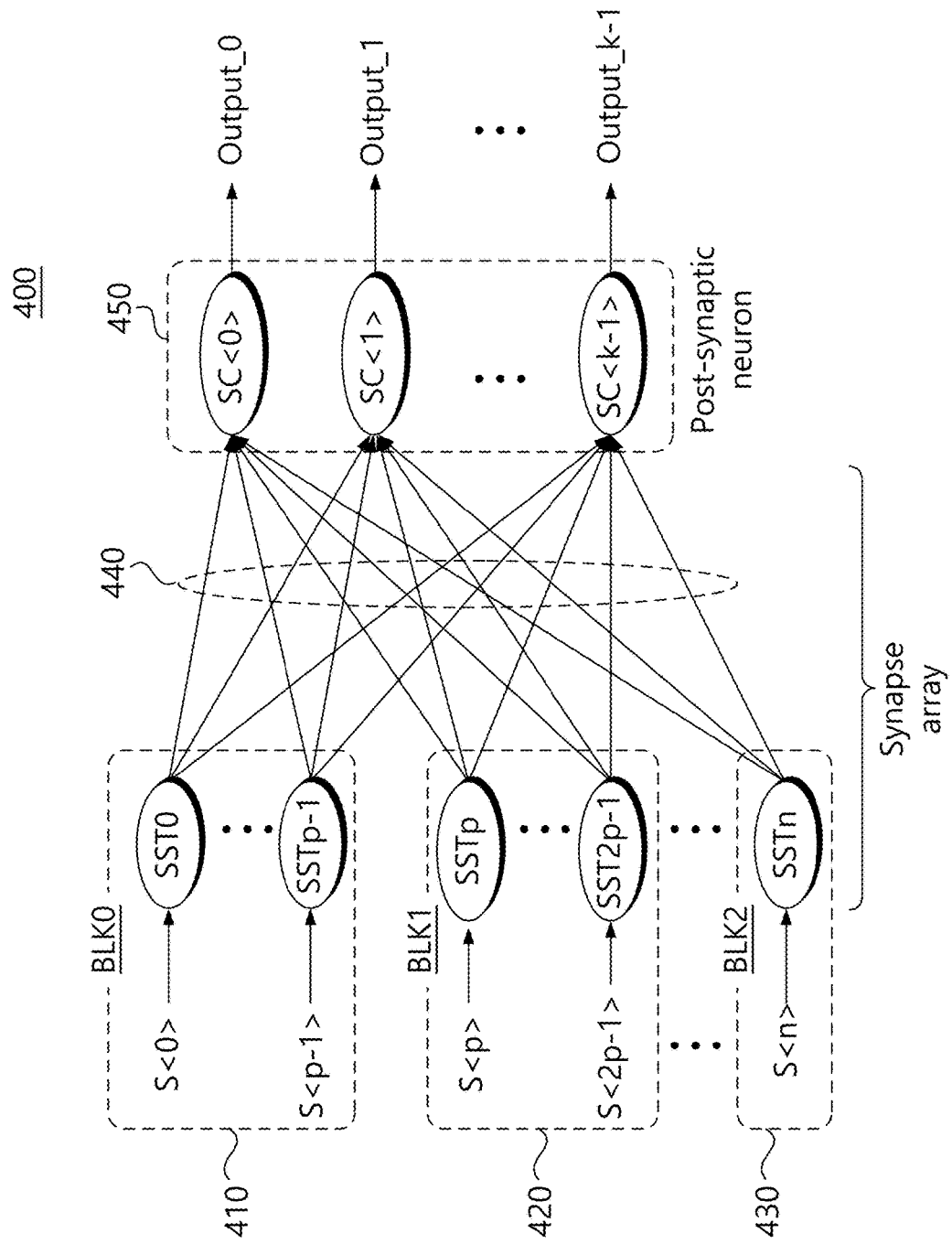
FIG. 16 is a diagram illustrating a spiking neural network SNN model according to another embodiment of the present invention.

FIG. 16 is a diagram illustrating a spiking neural network SNN model according to another embodiment of the present invention. Referring to FIG. 16, the spiking neural network 400 may increase the number of input nodes of the synapse array 440 by utilizing the cell array of the V-NAND flash memory. Here, the input node of the synapse array 440 may correspond to the gate terminal of the string select line SSL or the string select transistor SST.

If, in a spiking neural network SNN using only the input node 410, it is assumed that additional input nodes 420 and 430 are required. For example, this may correspond to a case in which the number of input nodes (e.g., 2k) for receiving the string selection signal S<j> is greater than the number p of string selection lines. Accordingly, in addition to the input node 410 receiving the 'p' string selection signals S<0> to S<p-1>, there may be a case in which additional 'p' input nodes are required.

It is assumed that the synapse array 440 reflecting the synaptic weight to the string selection signals S<0> to S<p-1> input to the input node 410 is implemented in the first memory block BLK0. In this case, by selecting another second memory block BLK1 from among a plurality of memory blocks included in the V-NAND nonvolatile memory device, it is possible to implement a synapse array for additional string selection signals S<p> to S<2p-1>. If more additional input nodes (e.g., for inputting S<2p>~S<n>) are needed, a third memory block (e.g., BLK2) is used to implement input nodes and synapse array.

Here, since the memory blocks of the V-NAND nonvolatile memory device share the string selection line SSL, it may be difficult to simultaneously select a plurality of memory blocks. Each of the input nodes 410, 420, and 430 may correspond to a string selection line SSL, and the string selection signals S<0>~S<p-1>, S<p>~S<2p>~1>, S<2p>~S<n> provided to the string selection line SSL may need to be independently provided to each of the blocks BLK0, BLK1, and BLK2. Accordingly, the cell array and the control circuit may need to be adjusted to a structure in which a plurality of memory blocks can be simultaneously selected (multi-block selection). To this end, the string selection line SSL of the memory blocks BLK0, BLK1, and BLK2 in which the input nodes 410, 420, and 430 are implemented may be separated in units of memory blocks. Such expansion of the input node of the spiking neural network SNN can be more easily implemented in a V-NAND nonvolatile memory device formed in a COP (Cell On Peripheral) structure.

The sensing circuit 450 constituting the post-synaptic neuron may be easily implemented through a bit line shared by each of the memory blocks BLK0, BLK1, and BLK2. For example, through selection of the string selection lines SSL and the word line WL corresponding to the input nodes 410, 420, and 430, the synaptic current is transmitted to one bit line BL or one bit line pair (BL Pair). Then, 'k' output nodes may be configured through the switch transistors SWT and the sensing circuit unit 450 connected to one bit line BL or one bit line pair BL Pair.

In the above description, it has been described that the spiking neural network SNN can be reconfigured using another memory block from which the string selection line is separated when an additional input node needs to be configured.

Figure 17:
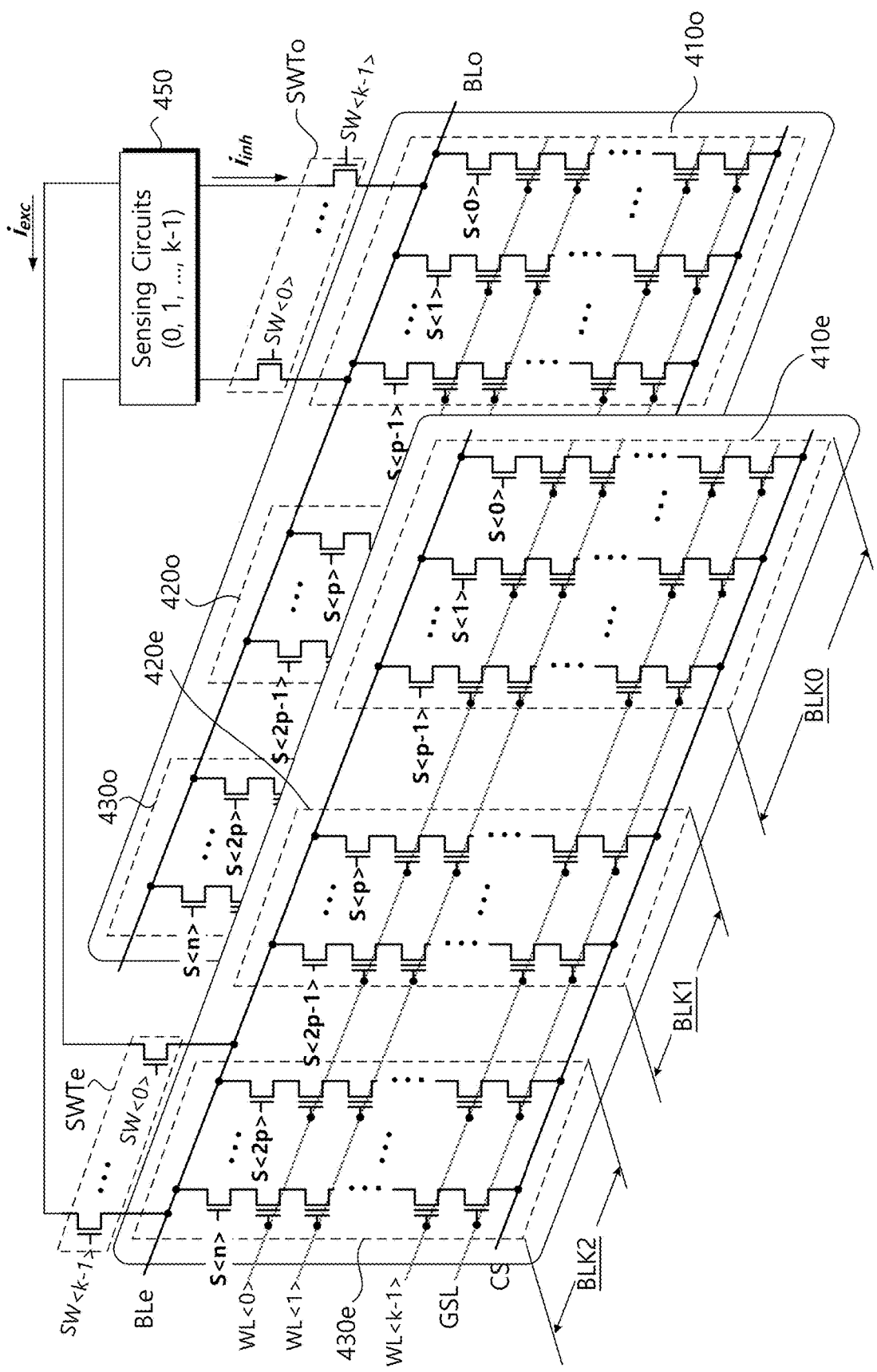
FIG. 17 is a circuit diagram illustrating a method of reconfiguring a synapse array for implementing the input node expansion of the spiking neural network SNN of FIG. 16.

FIG. 17 is a circuit diagram illustrating a method of reconfiguring a synapse array for implementing the input node expansion of the spiking neural network SNN of FIG. 16. It is assumed that the number of string selection lines (SSL) existing in one memory block (e.g., BLK0) is 'p' and the number of input nodes required in the spiking neural network SNN is greater than 'p'. This may correspond to a case in which the number of input nodes (e.g., n+1) for receiving the string selection signal S<j> is greater than the number p of the string selection lines (or word lines).

String selection lines SSL and memory cells of the first memory block BLK0 may constitute a first synapse arrays (410e, 410o) to receive the string selection signals S<0> to S<p-1> and to apply the first synaptic weight WS_0. In addition, the string selection line SSL and the memory cells of the second memory block BLK1 may constitute the second synapse arrays (420e, 420o) to receive the string selection signals S<p> to S<2p-1> and apply the second synaptic weight WS_1. In addition, the string selection line SSL and the memory cells of the third memory block BLK2 may constitute a third arrays (430e, 430o) to receive the string selection signals S<2p> to S<n> and apply the third synaptic weight WS_2.

The synapse arrays 410, 420, and 430 each have separate string selection lines. However, the synapse arrays 410, 420, and 430 share the bit line BL. For example, even synapse arrays 410e, 420e, and 430e corresponding to different memory blocks BLK0, BLK1, and BLK2 are also connected to one even bit line BLe. In addition, odd synapse arrays 410o, 420o, and 430o corresponding to different memory blocks BLK0, BLK1, and BLK2 are also connected to one odd bit line BLo.

To implement a post-synapse neuron, the bit line pair BLe and BLo are connected to 'k' sense circuits 450 by switch transistors SWTe and SWTo. For example, the even bit line BLe may be connected to the sensing circuits 450 by the even switch transistors SWTe. In addition, the stimulation current $i_{exc}$ flowing through the even synapse arrays 410e, 420e, and 430e through the even bit line BLe will be transmitted to the sensing circuits 450. Also, the odd bit line BLo may be connected to the sensing circuits 450 by the odd switch transistors SWTo. In addition, the inhibition current $i_{inh}$ flowing through the odd synapse arrays 410o, 420o, and 430o through the odd bit line BLo will be transferred to the sensing circuits 450.

According to the above embodiment, when it is desired to provide additional input nodes to configure a spiking neural network SNN, a plurality of memory blocks capable of simultaneous selection may be used. The input node expansion of such a spiking neural network SNN can be easily reconfigured in a V-NAND nonvolatile memory device formed in the COP (Cell On Peripheral) structure.

Figure 18:
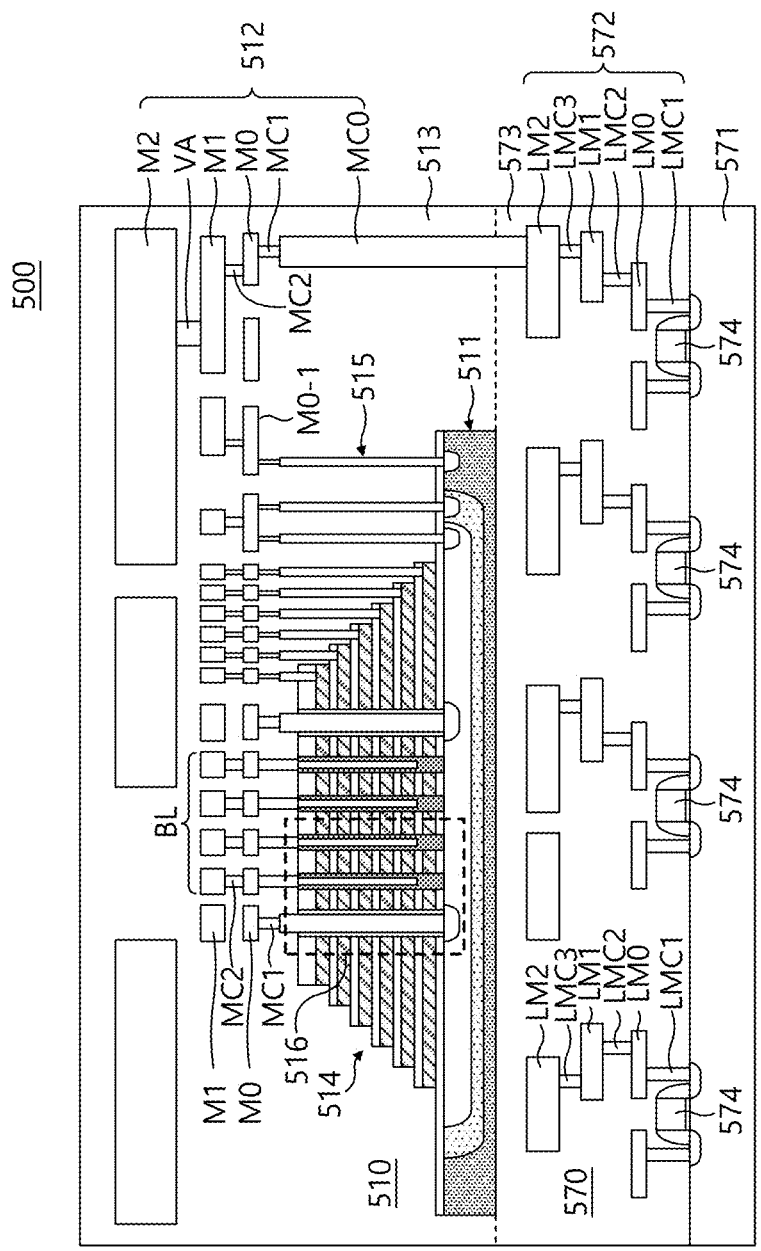
FIG. 18 is a cross-sectional view schematically illustrating a COP structure of a nonvolatile memory device capable of forming a spiking neural network according to an embodiment of the present invention.

FIG. 18 is a cross-sectional view schematically illustrating a COP structure of a nonvolatile memory device capable of forming a spiking neural network SNN according to an embodiment of the present invention. Referring to FIG. 18, the nonvolatile memory device 500 may have a cell on peripheral (COP) structure in which a cell region 510 is stacked on a peripheral region 570. At least a portion of the peripheral region 570 and at least a portion of the cell region 510 may vertically overlap. For convenience, an example in which all of the cell region 510 and the entire peripheral region 570 overlap each other will be described herein, and the present invention is not intended to be limited thereto.

The peripheral region 570 may include one or more peripheral transistors 574 disposed on the lower substrate 571, a peripheral circuit wiring 572 electrically connected to the peripheral transistor 574, and a lower insulating layer 573 covering the peripheral circuit wiring 572 and the peripheral transistor 574.

The cell region 510 may include an upper substrate 511, a cell array 514 disposed on the upper substrate 511, and an upper insulating layer 513 covering the cell array 514. The cell region 510 may further include a connection circuit wiring 512 electrically connecting the cell array 514 and the peripheral circuit wiring 572. The cell array 514 may include metal contacts 515 electrically connecting the cell array 514 to the connection circuit wiring 512.

In the peripheral region 570, the lower substrate 571 may include a semiconductor substrate such as a silicon wafer. The peripheral circuit wiring 572 may include, for example, a lower metal line LM0, an intermediate metal line LM1, and an upper metal line LM2 sequentially stacked on the lower substrate 571. The peripheral circuit wiring 572 includes a lower metal contact LMC1 that electrically connects a peripheral transistor 574 to the lower metal wiring LM0, and a middle metal contact LMC2 electrically connecting bottom metal wire LM0 to middle metal wire LM1, and an upper metal contact LMC3 electrically connecting the middle metal line LM1 to the upper metal line LM2. It should be noted that certain items, such as a lower metal contact LMC1 are described in the singular, but include a plurality of such items.

In the cell region 510, the cell array 514 may have a three-dimensional structure in which a plurality of cells are vertically stacked on an upper substrate 511 having a well structure. The metal contacts 515 may electrically connect the plurality of memory cells of the cell array 514 and the upper substrate 511 to the connection circuit wiring 512.

The connection circuit wiring 512 may be electrically connected to the peripheral circuit wiring 572. The connection circuit wire 512 may include a lower metal line M0, an intermediate metal line M1, and an upper metal line M2 sequentially stacked on the cell array 514. The connection circuit wiring 512 may further include a connection metal contact MC0 that electrically connects the peripheral circuit wiring 572 to the connection circuit wiring 512, a lower metal contact MC1 electrically connecting the connecting metal contact MC0 and the lower metal wiring M0, a medium metal contact MC2 electrically connecting the lower metal line M0 to the middle metal line M1, and a via VA as an upper metal contact electrically connecting the middle metal line M1 to the upper metal line M2. The lower metal contact MC1 may connect the cell array 514 to the lower metal line M0. The intermediate metal line M1 may include a bit line BL electrically connected to a vertical channel of the cell array 514.

In the case of the nonvolatile memory device 500 having the above-described COP structure, the switch transistor SWT and the sensing circuit connected to the bit line BL may be formed in the peripheral region 570. Alternatively, the switch transistor SWT may be implemented by adjusting extra transistors provided in the cell region 510.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A spiking neural network device, comprising:
   at least one NAND cell string including a first NAND cell string that includes a first string select transistor and a plurality of nonvolatile memory cells between a bit line and a ground select line;
   a string control circuit configured to detect randomly provided input spikes, assign channel addresses to the input spikes, and generate string selection signals to turn on the first string select transistor;
   a word line decoder configured to generate a word line selection signal for selecting a word line of a plurality of word lines for each of the plurality of nonvolatile memory cells in response to an input spike;
   a plurality of sensing circuits connected to the bit line, respectively corresponding to the plurality of word lines, each sensing circuit configured to generate an output spike according to a current transmitted through the bit line when a corresponding word line is selected;
   a plurality of switch transistors, each configured to connect one of the plurality of sensing circuits to the bit line according to a switch selection signal; and
   a switch decoder configured to generate a switch selection signal in synchronization with the word line selection signal for a selected word line,
   wherein:
   the bit line includes an even bit line and an odd bit line, and the at least one NAND cell string includes an even NAND cell string coupled to the even bit line and an odd NAND cell string coupled to the odd bit line,
   each of the even NAND cell string and the odd NAND cell string is respectively connected to the even bit line and the odd bit line in response to the string selection signals,
   when the word line selection signal is activated, a stimulation current is generated in the even NAND cell string and an inhibition current is generated in the odd NAND cell string, and
   any one of the plurality of sensing circuits comprises:
   a first current mirror configured to raise a voltage of a membrane potential node by mirroring the stimulation current;

a second current mirror configured to drop the voltage of the membrane potential node by mirroring the inhibition current; and and a pulse generator configured to generate a pulse by comparing the voltage of the membrane potential node with a threshold.

2. The device of claim 1, wherein the string control circuit activates the string selection signals for a string selection time period for reading the nonvolatile memory cells, in response to the input spikes.

3. The device of claim 2, wherein the at least one NAND cell string includes a second NAND cell string including a second string select transistor and a plurality of nonvolatile memory cells between the bit line and a ground select line, wherein the string control circuit is configured to turn on the first string select transistor of the first NAND cell string in response to a first input spike, and to turn on the second string select transistor of the second NAND cell string in response to a second input spike.

4. The device of claim 3, wherein the word line decoder is configured to generate the word line selection signal to additionally select previously unselected word lines from the second NAND cell string after the first string select transistor is turned off.

5. The device of claim 1, wherein the at least one NAND cell string is formed in a V-NAND structure in which the nonvolatile memory cells are vertically stacked with respect to a substrate.

6. The device of claim 1, wherein a dummy weight is stored in some of the plurality of nonvolatile memory cells to reduce the number of output nodes of a spiking neural network.

7. The device of claim 1, further comprising:
another bit line and another plurality of sensing circuits for increasing the number of output nodes of a spiking neural network.

8. A nonvolatile memory device, comprising:
a bit line;
a NAND cell string including a plurality of memory cells and configured to be connected to the bit line in response to string selection signals corresponding to channel addresses being assigned to randomly provided input spikes;
a plurality of sensing circuits configured to generate an output spike by sensing read currents of memory cells of the NAND cell string in units of word lines;
switch transistors configured to connect the bit line to any one of the plurality of sensing circuits in synchronization with a word line selection of the NAND cell string;
a string control circuit configured to generate a string selection signal activated for a string selection time period, which is activated by an input spike and has a pulse width greater than a pulse width of the input spike;
a word line decoder configured to sequentially or randomly select word lines of the NAND cell string during the string selection time period; and
a switch decoder configured to sequentially or randomly turn on the switch transistors in synchronization with the word line decoder, wherein weights for a spiking neural network SNN operation are programmed in the memory cells of the NAND cell string, and wherein the NAND cell string includes a string select transistor and the plurality of memory cells, and the device is configured such that the string select transistor is turned on for the string selection time period for reading the plurality of memory cells.

9. The device of claim 8, wherein the bit line is a first bit line and the NAND cell string is a first NAND cell string, and further comprising:
a second bit line; and
a second NAND cell string sharing a string selection line and word lines with the first NAND cell string,
wherein a stimulation weight is stored in the first NAND cell string and a suppression weight is stored in the second NAND cell string.

10. The device of claim 9, wherein each of the plurality of sensing circuits generates the output spike according to a stimulation current provided through the first bit line and an inhibition current provided through the second bit line.

11. The device of claim 10, wherein each of the plurality of sensing circuits comprises:
a first current mirror configured to pull up a membrane potential node according to the stimulation current;
a second current mirror configured to pull down the membrane potential node according to the inhibition current; and
a pulse generator configured to generate the output spike by comparing the voltage of the membrane potential node with a threshold value.

12. A method of operating a spiking neural network device storing synaptic weights in a plurality of NAND cell strings, the method comprising:
detecting a first input spike;
assigning a first channel address to the first input spike;
turning on a first string select transistor of a first NAND cell string for a string select time period in response to the first channel address;
sensing a cell current of the first NAND cell string through a first sensing circuit by selecting a first word line;
detecting a second input spike;
assigning a second channel address to the second input spike;
turning on a second string select transistor of a second NAND cell string during the string select time period in response to the second channel address; and
sensing a combined cell current of the first NAND cell string and the second NAND cell string through a second sensing circuit by selecting a second word line,
wherein after the second input spike is detected, the first word line is selected after the first string select transistor is turned off.

13. The method of claim 12, wherein the second input spike is not detected in the detecting of the first input spike, and the cell current of the first NAND cell string is sensed by the second sensing circuit when the second word line is selected.

* * * * *